United States Patent
Huang

(10) Patent No.: US 10,455,412 B2
(45) Date of Patent: Oct. 22, 2019

(54) METHOD, APPARATUS, AND SYSTEM FOR MIGRATING VIRTUAL NETWORK FUNCTION INSTANCE

(71) Applicant: Huawei Technologies Co., Ltd., Shenzhen (CN)

(72) Inventor: Yangcheng Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 15/585,862

(22) Filed: May 3, 2017

(65) Prior Publication Data

US 2017/0238171 A1 Aug. 17, 2017

Related U.S. Application Data

(63) Continuation of application No. PCT/CN2014/090145, filed on Nov. 3, 2014.

(51) Int. Cl.
*G06F 15/177* (2006.01)
*H04W 8/30* (2009.01)
(Continued)

(52) U.S. Cl.
CPC .......... *H04W 8/30* (2013.01); *G06F 9/45558* (2013.01); *G06F 9/4856* (2013.01);
(Continued)

(58) Field of Classification Search
CPC ............................. H04W 8/30; H04L 67/1095
See application file for complete search history.

(56) References Cited

U.S. PATENT DOCUMENTS 6,775,542 B1 8/2004 Vilander et al.
8,254,249 B2 8/2012 Wen et al.
(Continued)

FOREIGN PATENT DOCUMENTS

CN 101430649 A 5/2009
CN 104115447 A 10/2014
(Continued)

OTHER PUBLICATIONS

Machine Translation and Abstract of Japanese Publication No. JP2013200805, Oct. 3, 2013, 20 pages
(Continued)

*Primary Examiner* — Hua Fan
(74) *Attorney, Agent, or Firm* — Conley Rose, P.C.

(57) ABSTRACT

A method, an apparatus, and a system for migrating a virtual network function instance, where the method includes starting a signaling message migration operation before or when running status information replication is started such that signaling message migration can also be performed synchronously with running status information replication during migration of a virtual network function instance. Because signaling message migration and running status information replication occur simultaneously, new running status information created after migration and changed running status information can be synchronized by signaling message migration. Therefore, an amount of replicated running status information is reduced, migration efficiency of a virtual network function instance is improved, a backup virtual network function can take over a faulty virtual network function as quickly as possible, and fault recovery efficiency is improved.

18 Claims, 8 Drawing Sheets

(51) Int. Cl.
  *H04L 29/08* (2006.01)
  *H04W 8/14* (2009.01)
  *H04L 12/24* (2006.01)
  *G06F 9/455* (2018.01)
  *G06F 9/48* (2006.01)
  *G06F 11/16* (2006.01)

(52) U.S. Cl.
  CPC ...... *G06F 11/1658* (2013.01); *H04L 41/0813* (2013.01); *H04L 67/1095* (2013.01); *H04W 8/14* (2013.01); *G06F 2009/4557* (2013.01)

(56) References Cited

U.S. PATENT DOCUMENTS

| | | | |
|---|---|---|---|
| 8,370,560 | B2 | 2/2013 | Dow et al. |
| 8,386,731 | B2 | 2/2013 | Mashtizadeh et al. |
| 8,490,092 | B2 | 7/2013 | Reuther et al. |
| 8,549,129 | B2 | 10/2013 | Zager et al. |
| 2010/0071025 | A1 | 3/2010 | Devine et al. |
| 2010/0107158 | A1 | 4/2010 | Chen et al. |
| 2011/0032830 | A1 | 2/2011 | Merwe et al. |
| 2013/0083690 | A1 | 4/2013 | Cardona et al. |
| 2013/0188555 | A1 | 7/2013 | Olsson et al. |
| 2013/0275708 | A1 | 10/2013 | Doi |
| 2013/0305246 | A1 | 11/2013 | Goggin et al. |
| 2014/0016456 | A1 | 1/2014 | Bonnier et al. |
| 2014/0359058 | A1* | 12/2014 | Karnawat ........... H04L 67/1097 709/217 |
| 2017/0034318 | A1 | 2/2017 | Gong et al. |

FOREIGN PATENT DOCUMENTS

| | | | |
|---|---|---|---|
| JP | 2013200805 | A | 10/2013 |
| JP | 2014010540 | A | 1/2014 |
| WO | 2012081099 | A1 | 6/2012 |
| WO | 2013110352 | A1 | 8/2013 |

OTHER PUBLICATIONS

Machine Translation and Abstract of Japanese Publication No. JP2014010540, Jan. 20, 2014, 17 pages.

Foreign Communication From A Counterpart Application, Japanese Application No. 2017523794, Japanese Notice of Rejection dated Jun. 19, 2018, 2 pages.
Foreign Communication From A Counterpart Application, Japanese Application No. 2017523794, English Translation of Japanese Notice of Rejection dated Jun. 26, 2018, 3 pages.
Liu, H., et al.,"Live Migration of Virtual Machine Based on Full System Trace and Replay," XP058200237, Proceedings of the 18th ACM International Symposium on High Performance Distributed Computing, Jun. 11-13, 2009, 10 pages.
Ma, F., et al., "Live Virtual Machine Migration based on Improved Pre-copy Approach," XP031735101, IEEE International Conference on Software Engineering and Service Sciences, Jul. 16, 2010, 4 pages.
Foreign Communication From A Counterpart Application, European Application No. 14905543.6, Extended European Search Report dated Sep. 29, 2017, 12 pages.
Machine Translation and Abstract of Chinese Publication No. CN101430649, May 13, 2009, 17 pages.
"3rd Generation Partnership Project; Technical Specification Group Core Network and Terminals; Restoration procedures (Release 12)," 3GPP TS 23.007, V12.6.0, Technical Specification, Sep. 2014, 91 pages.
"3rd Generation Partnership Project; Technical Specification Group Services and System Aspects; General Packet Radio Services (GPRS) enhancements for Evolved Universal Terrestrial Radio Access Network (E-UTRAN) access (Release 13)," 3GPP TS 23.401, V13.0.0, Technical Specification, Sep. 2014, 308 pages.
Taleb, T., et al., "Ensuring Service Resilience in the EPS: MME Failure Restoration Case," IEEE Global Telecommunications Conference, Dec. 5-9, 2011, 5 pages.
Keller, E., et al., "Live Migration of an Entire Network (and its Hosts)," Hotnets, Proceedings of the 11th ACM Workshop on Hot Topics in Networks, Oct. 29-30, 2012, 6 pages.
Clark, C., et al., "Live Migration of Virutal Machines," USENIX Association, 2nd Symposium on Networked Systems Design & Implementation, 2005, pp. 273-286.
Foreign Communication From A Counterpart Application, PCT Application No. PCT/CN2014/090145, English Translation of International Search Report dated Jul. 22, 2015, 2 pages.
Foreign Communication From A Counterpart Application, PCT Application No. PCT/CN2014/090145, English Translation of Written Opinion dated Jul. 22, 2015, 6 pages.

* cited by examiner

METHOD, APPARATUS, AND SYSTEM FOR MIGRATING VIRTUAL NETWORK FUNCTION INSTANCE

CROSS-REFERENCE TO RELATED APPLICATIONS

This application is a continuation of International Patent Application No. PCT/CN2014/090145 filed on Nov. 3, 2014. The disclosure of which is hereby incorporated by reference in its entirety.

TECHNICAL FIELD

Embodiments of the present disclosure relate to the field of computers, and in particular, to a method, an apparatus, and a system for migrating a virtual network function (VNF) instance.

BACKGROUND

A basic principle of network function virtualization (NFV) is to use universal hardware such as x86 and a virtualization technology to bear a large quantity of software having different functions in order to reduce high device costs in a network. NFV may establish a VNF by means of software/hardware decoupling and function abstract such that functions of a network device are no longer dependent upon dedicated hardware and that resources can be fully shared flexibly. In this way, fast development and deployment of new services are implemented, and automatic deployment, flexible scaling, fault isolation, self-healing, and the like are performed based on actual service requirements.

A basic challenge to apply the virtualization technology to network functions is reliability. Many network functions to be virtualized play critical roles in a mobile network architecture. In particular, a core node such as a mobility management entity (MME) includes a large amount of user status information and the user status information is updated frequently, and therefore, any node-level fault is intolerable. However, in an NFV architecture, because network functions are implemented using software, in comparison with a hardware-based implementation solution, it is even more difficult to achieve carrier-class reliability.

In other approaches, a backup mode is primarily used to avoid impact caused by a network node fault. Using the MME as an example, when a fault occurs, user equipment (UE) context information is sent to a backup MME node by means of status synchronization. However, a core node like the MME involves a large amount of fast changing UE context information, and the status synchronization consumes a lot of time and resources. Consequently, fault recovery is slow, and reliability is reduced.

SUMMARY

Embodiments of the present disclosure provide a method and an apparatus for migrating a VNF instance, to improve migration efficiency of the VNF instance such that when a VNF running the VNF instance or a network node hosting the VNF is faulty, fault recovery efficiency can be improved.

According to a first aspect, an embodiment of the present disclosure provides a method for migrating a VNF instance, where the method includes starting a running status information replication operation, where the replication operation includes sending copies of first running status information to a destination VNF, where the first running status information is running status information that already exists in a source VNF before the replication operation is started, starting a signaling message migration operation when starting the replication operation or before starting the replication operation, where before a first signaling message is processed by the source VNF, the migration operation includes sending the first signaling message to the destination VNF, where the first signaling message instructs the destination VNF to create second running status information on the destination VNF, and sending a copy of a second signaling message to the destination VNF, where the copy of the second signaling message instructs the destination VNF to update the first running status information or the second running status information, and allowing the source VNF to go offline if determined that all the copies of the first running status information are received by the destination VNF and that both the first signaling message and the copy of the second signaling message are processed by the destination VNF such that the destination VNF runs the VNF instance.

With reference to the first aspect, in a first possible implementation manner of the first aspect, sending copies of first running status information to a destination VNF includes sending the copies of the first running status information to the destination VNF in descending order of priorities, where the priorities of the copies of the first running status information are higher if change frequencies of the first running status information are higher.

With reference to the first possible implementation manner of the first aspect, in a second possible implementation manner, the change frequencies are historical change frequencies of the first running status information or future change frequencies predicted according to historical change information of the first running status information.

With reference to the first aspect, or the first possible implementation manner or second possible implementation manner of the first aspect, in a third possible implementation manner, the step of determining that all the copies of the first running status information are received by the destination VNF includes receiving a first digest sent by the destination VNF after all the copies of the first running status information are sent to the destination VNF, where the first digest is generated by the destination VNF according to the running status information received by the destination VNF from the source VNF, and determining that all the copies of the first running status information are received by the destination VNF if the first digest is the same as a second digest, where the second digest is determined by the source VNF according to the first running status information or the copies of the first running status information.

With reference to the first aspect, or any possible implementation manner of the first to third possible implementation manners of the first aspect, in a fourth possible implementation manner, the running status information includes a UE context.

According to a second aspect, an embodiment of the present disclosure provides a method for migrating a VNF instance, where the VNF instance is migrated from a source VNF to a destination VNF, the method is applied to the destination VNF, and the method includes receiving copies of first running status information, where the first running status information is running status information that already exists in the source VNF before the migration begins, receiving a first signaling message, creating second running status information according to the first signaling message, receiving a copy of a second signaling message, updating the first running status information or the second running status information according to the copy of the second signaling message, and instructing the source VNF to go offline if determined that all the copies of the first running status information are received and that both the first signaling message and the copy of the second signaling message are processed such that the destination VNF runs the VNF instance.

With reference to the second aspect, in a first possible implementation manner of the second aspect, updating the first running status information according to the copy of the second signaling message includes updating the first running status information according to the second signaling message if first running status information that the copy of the second signaling message instructs to update exists, or buffering the copy of the second signaling message or a preprocessing result of the copy of the second signaling message if first running status information that the copy of the second signaling message instructs to update does not exist in order to update the first running status information according to the copy of the second signaling message or the preprocessing result of the copy of the second signaling message after receiving the nonexistent first running status information from the source VNF.

With reference to the first possible implementation manner of the second aspect, in a second possible implementation manner, buffering a preprocessing result of the copy of the second signaling message includes parsing the copy of the second signaling message to acquire information carried in the copy of the second signaling message, constructing the information carried in the copy of the second signaling message into a data structure same as a data structure of the running status information that the copy of the second signaling message instructs to update, and buffering the data structure.

With reference to the second aspect, or the first possible implementation manner of the second aspect, or the second possible implementation manner of the second aspect, in a third possible implementation manner, the step of determining that all the copies of the first running status information are received includes determining a first digest according to the received copies of the first running status information, sending the first digest to the source VNF, and if indication information sent by the source VNF is received, where the indication information indicates that the first digest is the same as a second digest determined by the source VNF, determining that all the copies of the first running status information are received, where the second digest is determined by the source VNF according to all the first running status information.

With reference to the second aspect, or any possible implementation manner of the first to third possible implementation manners of the second aspect, in a fourth possible implementation manner, instructing the source VNF to go offline includes sending a go-offline instruction to the source VNF such that the source VNF performs the go-offline operation.

According to a third aspect, an embodiment of the present disclosure provides an apparatus for migrating a VNF instance, where the apparatus includes a running status information replication unit configured to start a running status information replication operation, where the replication operation includes sending copies of first running status information to a destination VNF, where the first running status information is running status information that already exists in a source VNF before the replication operation is started, a signaling message migration unit configured to start a signaling message migration operation when the replication operation is started or before the replication operation is started, where before a first signaling message is processed by the source VNF, the migration operation includes sending the first signaling message to the destination VNF, where the first signaling message instructs the destination VNF to create second running status information on the destination VNF, and sending a copy of a second signaling message to the destination VNF, where the copy of the second signaling message instructs the destination VNF to update the first running status information or the second running status information, and a go-offline unit configured to allow to go offline if determined that all the copies of the first running status information are received by the destination VNF and that both the first signaling message and the copy of the second signaling message are completely processed by the destination VNF such that a destination VNF runs the VNF instance.

With reference to the third aspect, in a first possible implementation manner of the third aspect, the running status information replication unit is further configured to send the copies of the first running status information to the destination VNF in descending order of priorities, where the priorities of the copies of the first running status information are higher if change frequencies of the first running status information are higher.

According to a fourth aspect, an embodiment of the present disclosure provides an apparatus for migrating a VNF instance, where the apparatus includes a first receiving unit configured to receive copies of first running status information, where the first running status information is running status information that already exists in a source VNF before the migration begins, a second receiving unit configured to receive a first signaling message, a running status information creation unit configured to create second running status information according to the first signaling message received by the second receiving unit, a third receiving unit configured to receive a copy of a second signaling message, a running status information updating unit configured to update the first running status information or the second running status information according to the copy of the second signaling message received by the third receiving unit, and a go-offline unit configured to instruct the source VNF to go offline if determined that all the copies of the first running status information are received and that both the first signaling message and the copy of the second signaling message are processed such that a destination VNF runs the VNF instance.

With reference to the fourth aspect, in a first possible implementation manner of the fourth aspect, in an aspect of updating the first running status information according to the copy of the second signaling message received by the third receiving unit, the running status information updating unit is further configured to update the first running status information according to the second signaling message if first running status information that the copy of the second signaling message instructs to update exists, or buffer the copy of the second signaling message or a preprocessing result of the copy of the second signaling message if first running status information that the copy of the second signaling message instructs to update does not exist in order to update the first running status information according to the copy of the second signaling message or the preprocessing result of the copy of the second signaling message after the nonexistent first running status information is received from the source VNF.

According to a fifth aspect, an embodiment of the present disclosure provides a network node, where the network node includes a hardware layer, a virtual machine monitor running on the hardware layer, and one or more virtual machines running on the virtual machine monitor, where a first VNF runs in the one or more virtual machines, where the first VNF is configured to start a running status information replication operation, where the replication operation includes sending copies of first running status information to a second VNF, where the first running status information is running status information associated with a VNF instance running on the first VNF and already exists in the first VNF before the replication operation is started. The first VNF is further configured to start a signaling message migration operation when the replication operation is started or before the replication operation is started, where the migration operation includes sending the first signaling message to the second VNF before a first signaling message is processed by the first VNF, where the first signaling message instructs the second VNF to create second running status information on the second VNF, and sending a copy of a second signaling message to the second VNF, where the copy of the second signaling message instructs the second VNF to update the first running status information or the second running status information, and the first VNF is further configured to allow the first VNF to go offline if determined that all the copies of the first running status information are received by the second VNF and that both the first signaling message and the copy of the second signaling message are processed by the second VNF such that the second VNF runs the VNF instance.

With reference to the fifth aspect, in a first possible implementation manner of the fifth aspect, in an aspect of performing the replication operation, the first VNF is further configured to send the copies of the first running status information to the second VNF in descending order of priorities, where the priorities of the copies of the first running status information are higher if change frequencies of the first running status information are higher.

According to a sixth aspect, an embodiment of the present disclosure provides a network node, where the network node includes a hardware layer, a virtual machine monitor running on the hardware layer, and one or more virtual machines running on the virtual machine monitor, where a second VNF runs in the one or more virtual machines, where the second VNF is configured to receive copies of first running status information, where the first running status information is running status information that already exists in a first VNF before an operation of migrating a VNF instance begins, where the VNF instance runs on the first VNF before the migration operation begins, receive a first signaling message, and create second running status information according to the first signaling message, receive a copy of a second signaling message, and update the first running status information or the second running status information according to the copy of the second signaling message, and instruct the first VNF to go offline if determined that all the copies of the first running status information are received and that both the first signaling message and the copy of the second signaling message are processed such that the second VNF runs the VNF instance.

With reference to the sixth aspect, in a first possible implementation manner of the sixth aspect, in an aspect of updating the first running status information according to the copy of the second signaling message, the second VNF is further configured to if first running status information that the copy of the second signaling message instructs to update exists, update the first running status information according to the second signaling message the priorities of the copies of the first running status information are higher, or buffer the copy of the second signaling message or a preprocessing result of the copy of the second signaling message if first running status information that the copy of the second signaling message instructs to update does not exist in order to update the first running status information according to the copy of the second signaling message or the preprocessing result of the copy of the second signaling message after receiving the nonexistent first running status information from the source VNF.

According to a seventh aspect, an embodiment of the present disclosure provides a system for migrating a VNF instance, where the migration system includes a source network node and a destination network node, a source VNF runs on the source network node, a destination VNF runs on the destination network node, and before the VNF instance is migrated, the VNF instance runs on the source VNF, where the source VNF is configured to start and perform a running status information replication operation, where the replication operation includes sending copies of first running status information to the destination VNF on the destination network node, where the first running status information is running status information that already exists in the source VNF before the replication operation is started. The destination VNF is configured to receive and store the copies of the first running status information from the source VNF. The source VNF is further configured to start and perform a signaling message migration operation when the replication operation is started or before the replication operation is started, where before a first signaling message is processed by the source VNF, the migration operation includes sending the first signaling message to the destination VNF, and sending a copy of a second signaling message to the destination VNF. The destination VNF is further configured to receive the first signaling message, create second running status information according to the first signaling message, receive the copy of the second signaling message, and update the first running status information or the second running status information according to the copy of the second signaling message. The source VNF is further configured to allow the source VNF to go offline if determined that all the copies of the first running status information are received by the destination VNF and that both the first signaling message and the copy of the second signaling message are processed by the destination VNF such that the destination VNF runs the VNF instance.

According to an eighth aspect, an embodiment of the present disclosure provides a system for migrating a VNF instance, where the migration system includes a source network node, a destination network node, and a third-party management function entity, a source VNF runs on the source network node, a destination VNF runs on the destination network node, and before the VNF instance is migrated, the VNF instance runs on the source VNF, where the third-party management function entity is configured to control the source VNF to start a running status information replication operation, and control the source VNF to start a signaling message migration operation when the replication operation is started or before the replication operation is started. The source VNF is configured to start and perform the running status information replication operation under the control of the third-party management function entity, where the replication operation includes sending copies of first running status information to the destination VNF, where the first running status information is running status information that already exists in the source VNF before the replication operation is started. The destination VNF is configured to receive and store the copies of the first running status information from the source VNF. The source VNF is further configured to start and perform the signaling message migration operation under the control of the third-party management function entity, where before a first signaling message is processed by the source VNF, the migration operation includes sending the first signaling message to the destination VNF, and sending a copy of a second signaling message to the destination VNF. The destination VNF is further configured to receive the first signaling message, create second running status information according to the first signaling message, receive the copy of the second signaling message, and update the first running status information or the second running status information according to the copy of the second signaling message. The destination VNF is further configured to send a go-offline instruction to the third-party management function entity if determined that all the copies of the first running status information are received and that both the first signaling message and the copy of the second signaling message are processed, and the third-party management function entity is further configured to control, according to the instruction message, the source VNF to go offline such that the destination VNF runs the VNF instance.

As can be seen, the embodiments of the present disclosure provide a method, an apparatus, and a system for migrating a VNF instance. Before or when running status information replication is started, a signaling message migration operation is started such that signaling message migration can also be performed synchronously with running status information replication during migration of a VNF instance. When a large amount of fast changing running status information exists on a VNF, in comparison with the other approaches in which running status information before migration begins, new running status information created after migration begins, and changed running status information all need to be synchronized to a destination VNF, in the embodiments of the present disclosure, a low-cost signaling message migration mode is used such that the new running status information created after migration begins and the changed running status information can occur on the destination VNF with signaling message migration. Therefore, a high-cost synchronization operation on a large amount of running status information is avoided, migration efficiency of a VNF instance is improved, a backup VNF can take over a faulty VNF as quickly as possible, and fault recovery efficiency is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure shall fall within the protection scope of the present disclosure.

Figure 1:
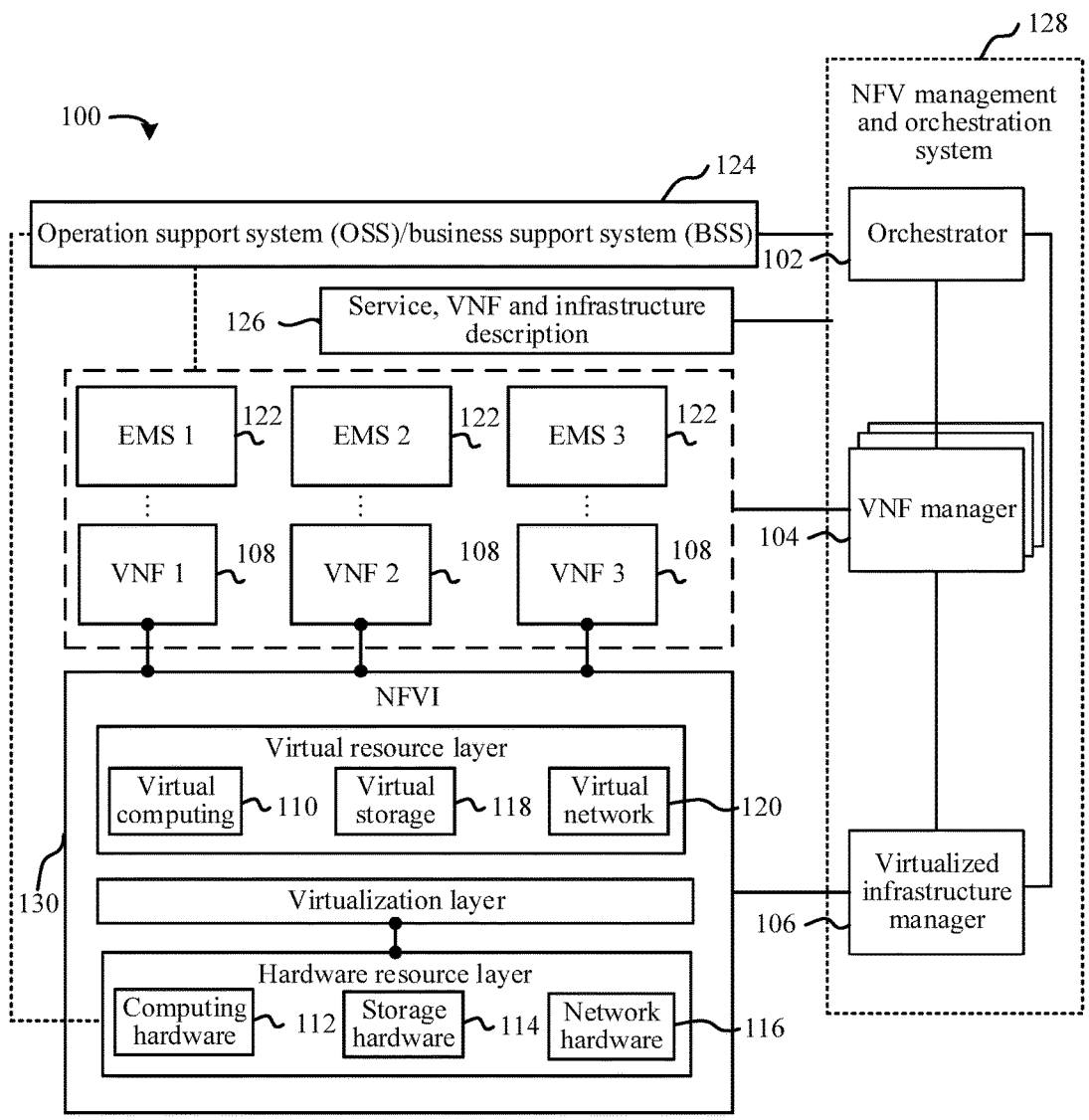
FIG. 1 is a schematic architectural diagram of an NFV system according to an embodiment of the present disclosure.

Referring to FIG. 1, FIG. 1 is a schematic architectural diagram of an NFV system 100 to which an embodiment of the present disclosure may be applied. It should be noted that, the NFV system is described only as an example, and an application scope of the present disclosure is not limited to this.

The NFV system shown in FIG. 1 may be implemented using multiple networks, for example, a data center network, a service provider network, or a local area network (LAN). As shown in FIG. 1, the NFV system may include an NFV management and orchestration system 128, NFV infrastructure (NFVI) 130, multiple VNFs 108 (designated as VNF 1, VNF 2 and VNF 3), multiple element management systems (EMS) 122 (designated as EMS 1, EMS 2 and EMS 3), a service, VNF and infrastructure description system 126, and one or more operation support system/business support systems (OSS/BSS) 124.

The NFV management and orchestration system 128 may include an orchestrator 102, one or more VNF managers 104, and one or more virtualized infrastructure managers 106. The NFVI 130 may include a hardware resource layer including computing hardware 112, storage hardware 114, and network hardware 116, a virtualization layer, and a virtual resource layer including virtual computing 110 (such as a virtual machine), virtual storage 118, and a virtual network 120. The computing hardware 112 may be a dedicated processor or a general-purpose processor configured to provide processing and computing functions. The storage hardware 114 is configured to provide a storage capability, where the storage capability may be provided by the storage hardware 114 itself (for example, a local memory of a server), or may be provided by a network (for example, a server is connected to a network storage device through a network). The network hardware 116 may be a switch, a router, and/or other network devices. The network hardware 116 is configured to implement communication between multiple devices, and the multiple devices are connected in a wireless or wired manner. The virtualization layer in the NFVI 130 is configured to abstract hardware resources of the hardware resource layer, decouple the VNF 108 from a physical layer to which the hardware resources belong, and provide virtual resources to the VNF 108. As shown in FIG. 1, the virtual resources may include the virtual computing 110, the virtual storage 118, and the virtual network 120. The virtual computing 110 and the virtual storage 118 may be provided to the VNF 108 in a form of a virtual machine or other virtual containers. For example, one or more VNFs 108 may be deployed on a virtual machine. The virtualization layer forms the virtual network 120 by abstracting the network hardware 116. The virtual network 120, for example, a virtual switch (for example, a vSwitch) is configured to implement communication between multiple virtual machines or between multiple virtual containers bearing VNFs 108, in other forms. Virtualization of the network hardware may be implemented using a technology such as a virtual LAN (VLAN), a virtual private LAN service (VPLS), a virtual extensible local area network (VxLAN), or network virtualization using generic routing encapsulation (NVGRE). The OSS/BSS 124 is mainly oriented to a telecommunications service provider, and provides integrated network management and service operation functions, including network management (for example, fault monitoring and network information collection), charging management, customer service management, and the like. The service, VNF and infrastructure description system 126 is described in detail in the European Telecommunications Standards Institute (ETSI) Group Specification (GS) NFV 002 v1.1.1 standard, and is not described herein in this embodiment of the present disclosure.

The NFV management and orchestration system 128 may be configured to implement monitoring and management of the VNF 108 and the NFVI 130. The orchestrator 102 may communicate with one or more VNF managers 104 to implement resource-related requests, send configuration information to the VNF manager 104, and collect status information of the VNF 108. In addition, the orchestrator 102 may further communicate with the virtualized infrastructure manager 106 to implement resource allocation, and/or implement reservation and exchange of configuration information and status information of virtualized hardware resources. The VNF manager 104 may be configured to manage one or more VNFs 108, and implement various management functions, for example, initializing, updating, querying, and/or terminating the VNF 108. The virtualized infrastructure manager 106 may be configured to control and manage interactions between the VNF 108, and the computing hardware 112, the storage hardware 114, the network hardware 116, the virtual computing 110, the virtual storage 118, and the virtual network 120. For example, the virtualized infrastructure manager 106 may be configured to perform an operation of allocating a resource to the VNF 108. The VNF manager 104 and the virtualized infrastructure manager 106 may mutually communicate to exchange virtualized hardware resource configurations and status information.

The NFVI 130 includes hardware and software, which jointly establish a virtualized environment to deploy, manage, and execute the VNF 108, that is, the hardware resource layer and the virtual resource layer are configured to provide virtual resources such as virtual machines and/or virtual containers in other forms to the VNF 108.

As shown in FIG. 1, the VNF manager 104 may communicate with the VNF 108 and the EMS 122 to perform VNF lifecycle management and implement exchange of configuration information/status information. The VNF 108 is a virtualization of at least one network function, where the network function is previously provided by a physical network device. In an implementation manner, the VNF 108 may be a virtualized MME node configured to provide all network functions provided by a typical non-virtualized MME device. In another implementation manner, the VNF 108 may be configured to implement functions of some components in all components provided by a non-virtualized MME device. One or more VNFs 108 may be deployed on a virtual machine (or a virtual container in another form). The EMS 122 may be configured to manage one or more VNFs 108.

An MME is a key control node in a Long Term Evolution (LTE) access network of the 3rd Generation Partnership Project (3GPP) protocol, and is responsible for locating, paging, and relaying UE in idle mode. Simply, the MME is responsible for a signaling processing part. The MME is responsible for selecting a Serving Gateway (SGW) for the UE when UE is initialized and is connected to the MME. The MME is further configured to authenticate a user by interacting with a Home Subscriber Server (HSS), and allocate a temporary identifier (ID) to a user. The MME also supports interception and monitoring in a scope allowed by lawful interception.

In most of the following parts, the MME is used as an example to describe a method for migrating a VNF instance according to an embodiment of the present disclosure, that is, migrating a virtual MME instance from one virtual MME to another virtual MME, where the two virtual MMEs may be located in a same virtual machine (or a virtual container in another form), or may be located in different virtual machines. However, the present disclosure is not limited to implementation of migrating the virtual MME instance, and migration of all or some VNF instances of other types may also be implemented with reference to the method provided by this embodiment of the present disclosure.

Figure 2:
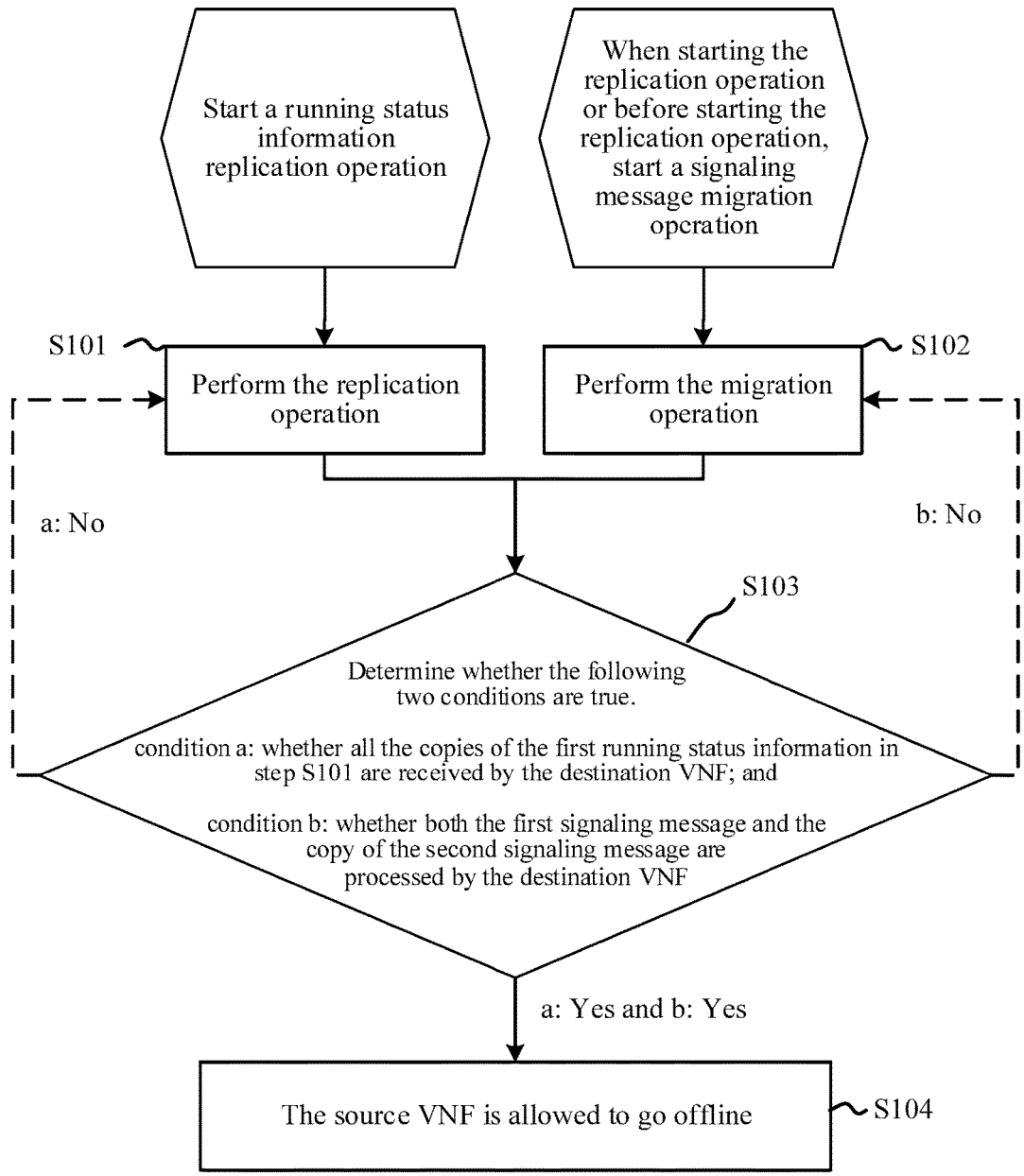
FIG. 2 is a schematic flowchart of a method for migrating a VNF instance according to an embodiment of the present disclosure.

Referring to FIG. 2, FIG. 2 is a schematic flowchart of a method for migrating a VNF instance according to an embodiment of the present disclosure. This method migrates a VNF instance from a source VNF to a destination VNF.

In this embodiment of the present disclosure, before the operation of migrating the VNF instance is started, the target VNF is also started and initialized.

It should be noted that, the source VNF and the target VNF in this embodiment of the present disclosure are generally located on different virtual devices, for example, on different network nodes, different virtual machines, or virtual containers in other forms. In other implementation manners, the source VNF and the target VNF may also be located in a same virtual container.

The migration method provided by this embodiment of the present disclosure may be applied to the source VNF, may be applied to a network node hosting the source VNF, or may be applied to an OSS shown in FIG. 1 or other management function entities.

As shown in FIG. 2, the method includes the following steps.

Step S101: Perform a running status information replication operation.

Further, the replication operation includes sending copies of first running status information to a destination VNF, where the first running status information is running status information that already exists in a source VNF before the replication operation is started. The running status information is running status information associated with a VNF instance that needs to be migrated, for example, user equipment contexts.

A person skilled in the art may understand that, sending copies of first running status information to a destination VNF, that is, replicating the first running status information to the destination VNF. Sending copies involved in the following embodiments may be understood similarly.

In this embodiment of the present disclosure, neither newly generated running status information nor updated running status information (if the information exists) in the source VNF after the replication operation is started needs to be replicated.

A person skilled in the art may understand that, when the method is applied to an OSS shown in FIG. 1 or another management function entity, step S101 may be understood to be that the OSS or another management function entity controls the source VNF to perform the running status information replication operation.

In an implementation manner, the OSS in FIG. 1 (or another management function entity) is responsible for monitoring the VNF instance. The OSS triggers start and initialization of a new VNF on the destination VNF when the OSS determines that the VNF instance needs to be migrated in order to receive the VNF instance sent by the source VNF and run the instance. Further, the OSS may further send a migration request to the source VNF such that the source VNF starts, after receiving the migration request, the operation of replicating the running status information to the destination VNF.

In another implementation manner, the source VNF is responsible for monitoring the VNF instance. The source VNF triggers the destination VNF, or the source VNF notifies the OSS and the OSS triggers the destination VNF when determining that the VNF instance needs to be migrated such that a new VNF is started and initialized on the destination VNF, where the VNF is configured to receive the VNF instance sent by the source VNF and run the instance. Further, after the new VNF instance on the destination VNF is initialized successfully, the source VNF starts to replicate, to the destination VNF, running status information associated with the VNF instance that needs to be migrated.

It should be noted that, whether the VNF instance needs to be migrated is decided by a specific migration requirement. For example, a software bug or malfunction is found in the source VNF, or a device fault is found in a virtual device in which the source VNF is located. This is only an example in this embodiment of the present disclosure, and is not limited.

For example, a VNF is a virtual MME, and a VNF instance that needs to be migrated is an instance that always runs before a source virtual MME is faulty, which is referred to as a virtual MME instance. The method provided by this embodiment of the present disclosure is to migrate the virtual MME instance from the source virtual MME to a destination virtual MME. During the migration of the virtual MME instance, running status information may include UE context information associated with the virtual MME instance. The concept of the context in this embodiment of the present disclosure has a same meaning as a context commonly used in the field of computers. For example, context information of a process includes a process status, one or more thread addresses and statuses thereof, a user data area, an address mapping of each code data segment, and even register information. Herein UEs include all UEs that access the virtual MME instance before the migration is started. The UE contexts are a set of data associated with behaviors of the UEs or associated with entities, including mobility management (MM) contexts associated with the user equipments and Evolved Packet System (EPS) bearer contexts, for example, an international mobile subscriber identity (IMSI) of user equipment, an access mode, a radio access capability, and a network capability (including a security algorithm and a key generation function supported by the UE). The context information may be subsequently queried, modified, and used. For more detailed descriptions about the UE contexts in the MME, reference may be made to section 5.7.2 in 3GPP Technical Specification (TS) 23.401, and details are not provided in this embodiment of the present disclosure again.

When the VNF is another virtual network device, correspondingly, the running status information in this embodiment of the present disclosure may also be information associated with a running instance of the other virtual network device, for example, UE context information associated with running instances of a virtual SGW and a virtual Packet Data Network gateway (PGW), for example, a parameter of an Internet Protocol (IP) bearer service (including all types of ID information and bearer Quality of Service (QoS) parameter information), routing information inside a network, and the like.

Step S102: Perform a signaling message migration operation. The migration operation is started when the replication operation of step S101 is started or before the replication operation is started.

In an implementation manner, a signaling message control operation is started K seconds before the replication operation of step S101 is started, where K is greater than 0 and K is less than or equal to 5. In other implementation manners, a person skilled in the art may decide a value of the K according to a time interval of signaling messages and/or other factors. A start time point is not limited in this embodiment of the present disclosure. A person skilled in the art may determine the start time point dynamically according to change regularity of the running status information, or determine an optimal start time point by means of prediction, or use other algorithms for implementation.

It should be noted that, in this embodiment of the present disclosure, the start of the signaling message migration operation during or before the running status information replication operation should be ensured. Otherwise, the signaling message migration operation is not started yet after the running status information replication operation is started. Because the signaling message migration operation is not started yet, on the one hand, the destination VNF possibly cannot receive a signaling message for updating the replicated running status information, resulting in status inconsistency of same running status information on the source VNF and the destination VNF, where the inconsistency may cause a service interruption. On the other hand, the source VNF still receives and parses a signaling message for creating running status information, but the destination VNF cannot receive the signaling message, and consequently, the source VNF still creates new running status information after the running status information replication operation is started. However, in the method provided by this embodiment of the present disclosure, the new running status information is not replicated to the destination VNF, and therefore, the destination VNF possibly cannot receive the new running status information. As can be seen, if the start of the signaling message migration operation during or before the running status information replication operation is not ensured, failure of running status information migration is easily caused, and further, failure of migration of the VNF instance is caused.

However, a person skilled in the art should understand that, assuming that there is a mechanism that can know beforehand that no signaling message will arrive in a period of time after the running status information replication operation is started, the signaling message migration operation may also be started in the period of time after the running status information replication operation is started.

Further, the migration operation performed in step S102 includes the following (a) and (b).

(a) Before a first signaling message is processed by the source VNF, send the first signaling message to the destination VNF, where the first signaling message instructs the destination VNF to create second running status information on the destination VNF.

It should be noted that, the first signaling message is a signaling message for creating running status information. Herein different from the first running status information, the second running status information is running status information newly created after the operation of migrating the VNF instance begins.

Using a virtual MME instance as an example, a signaling message for creating a UE context, for example, an attach message, may be forwarded to the destination VNF, and the source VNF will not receive the signaling message or will not process the signaling message. Herein a signaling flow forwarding operation is involved. "Processing" in this embodiment may be understood as acquiring content of the signaling message and creating corresponding running status information according to the content of the signaling message.

(b) Send a copy of a second signaling message to the destination VNF, where the copy of the second signaling message instructs the destination VNF to update the first running status information or the second running status information.

It should be noted that, the second signaling message is a signaling message for updating running status information. The source VNF provided in this embodiment of the present disclosure may also receive the second signaling message.

Using a virtual MME instance as an example, a signaling message for updating a user equipment context, for example, a Track Area Update message, will be replicated to the destination VNF. Both the source VNF and the destination VNF process the signaling message. Herein a signaling flow replication operation is involved.

Herein it should be noted that, if the source VNF determines, after receiving the second signaling message, that running status information that the second signaling message instructs to update does not exist on the source VNF, that is, the running status information is the second running status information created on only the destination VNF after the signaling message migration operation is started, the source VNF may not process the signaling message when receiving the signaling message, for example, discard the signaling message.

Optionally, in the method provided by this embodiment of the present disclosure, the second signaling message may be further classified into a signaling message for updating the second running status information and a signaling message for updating the first running status information. The second running status information is running status information created on a destination virtual device in (a), and the first running status information is running status information that exists on a source virtual device before the replication operation described in step S101 is started. The signaling message for updating the second running status information may be sent to only the destination VNF (because only the destination VNF has the new running status information), but the signaling message for updating the first running status information is sent to the source VNF and the destination VNF. A method for classifying the signaling message may be implemented using the other approaches, for example, deep packet inspection (DPI). After the classification, the foregoing two different operations may be performed respectively on second signaling messages of two different types. A person skilled in the art may understand specific implementation, which is not described in detail in this embodiment of the present disclosure again.

Optionally, in this embodiment of the present disclosure, the OSS (or a third-party management function entity) or the source VNF may perform re-encapsulation on an original signaling flow, and implement the foregoing signaling flow forwarding and/or replication operation using a temporary data tunnel established between the source VNF and the destination VNF.

In this embodiment of the present disclosure, because the signaling message migration operation and the running status information replication operation are performed almost simultaneously, a case in which after the second signaling message is replicated to the destination VNF, the first running status information that the second signaling message instructs to update is not replicated to the destination VNF yet (how to avoid the case will be described subsequently in this embodiment of the present disclosure) may exist. In this case, the destination VNF may first store the second signaling message, or preprocess the second signaling message and store a preprocessing result of the second signaling message. Further, a process of storing the preprocessing result may include parsing the copy of the second signaling message to acquire information carried in the copy of the second signaling message, constructing the information carried in the copy of the second signaling message into a data structure same as a data structure of the running status information that the copy of the second signaling message instructs to update, and buffering the data structure.

A beneficial effect of preprocessing the second signaling message includes that after the first running status information that the second signaling message instructs to update arrives at the destination VNF, if a data structure corresponding to the first running status information already exists in a buffer, the first running status information may be quickly replaced according to the buffered data structure such that the first running status information is quickly updated.

It should be noted that, determining whether the running status information exists or the data structure exists by the destination VNF may be performed for a single signaling message or a single piece of running status information, or may be performed in batches, for example, determining a group of received signaling messages or a group of received running status information. A specific algorithm may be determined by a person skilled in the art according to a type of a signaling message, or may be determined according to factors such as a time of receiving a signaling message or running status information, or may be determined according to a combination of the foregoing factors, which is not limited in this embodiment of the present disclosure.

In this embodiment of the present disclosure, a first signaling message for creating running status information will not be processed by the source VNF, and a second signaling message for updating running status information may be processed by the source VNF and the destination VNF. There are multiple manners for achieving this objective.

In an implementation manner, the source VNF directly forwards a first signaling message to the destination VNF when receiving a signaling message and determining that the signaling message is the first signaling message, and the source VNF replicates a second signaling message and sends a copy of the second signaling message to the destination VNF when receiving a signaling message and determining that the signaling message is the second signaling message. In this way, the source VNF and the destination VNF may also process the signaling message.

In another implementation manner, a third-party management function entity, for example, the OSS is responsible for controlling operations such as sending a signaling message. Before the signaling message arrives at the source VNF, the third-party management function entity analyzes the signaling message using a signaling identification technology, for example, DPI. The third-party management function entity performs control to directly forward the first signaling message to the destination VNF when determining that the signaling message is a first signaling message, where the first signaling message is no longer sent to the source VNF. The third-party management function entity controls implementation of replication of the second signaling message, and controls implementation of respectively sending the second signaling message and a copy of the second signaling message to the source VNF and the destination VNF when determining that the signaling message is a second signaling message.

Figure 3:
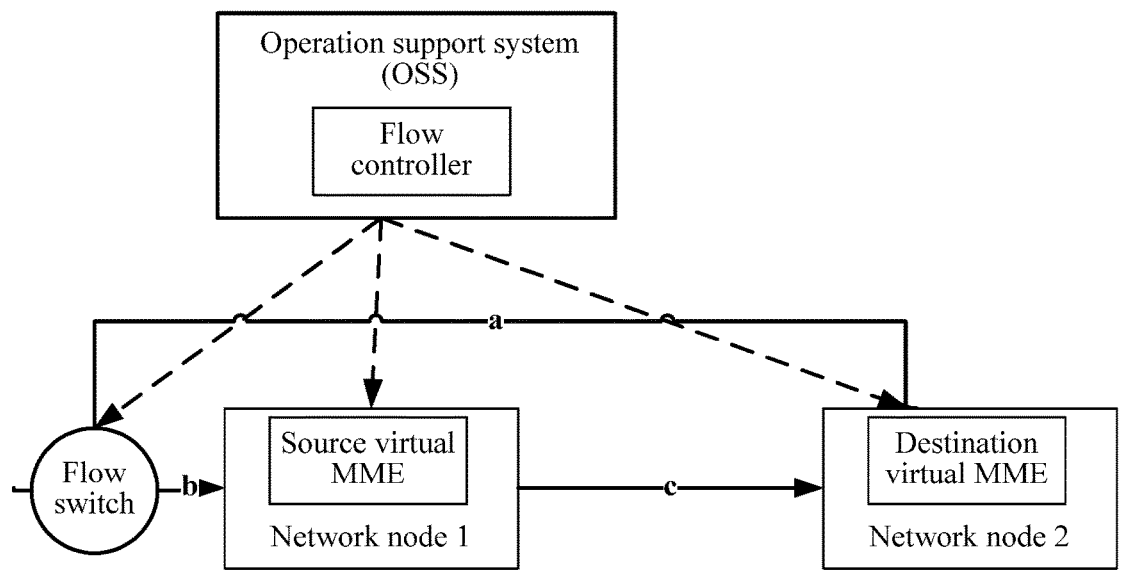
FIG. 3 is a schematic implementation architectural diagram in which a third-party management function entity controls migration implementation according to an embodiment of the present disclosure.

For the latter manner, this embodiment of the present disclosure provides an exemplary implementation method using a virtual MME as an example, assuming that an open virtual switch, namely, an open vSwitch mechanism, is introduced to an NFV system architecture shown in FIG. 1, referring to FIG. 3, a flow controller in the open vSwitch generally runs in the OSS, and a flow switch runs on a path of a signaling data flow. A DPI function is added in the flow switch, for determining the type of the signaling message. The flow controller is configured to specify an operation policy for the signaling flow and is configured to configure the flow switch. As shown in FIG. 3, the flow switch identifies, using the DPI technology, that the signaling is signaling for creating running status information, and directly forwards the signaling to a destination virtual MME (a). If it is identified that the signaling is signaling for updating running status information, the flow switch transmits the signaling to a source virtual MME and the destination virtual MME (b and a). Optionally, the OSS in the implementation method may be further configured to control the source virtual MME to replicate running status information to the destination virtual MME (c). The source virtual MME and the destination virtual MME in the embodiment shown in FIG. 3 are respectively hosted on a network node 1 and a network node 2. In other implementation manners, the source virtual MME and the destination virtual MME may be hosted on a same network node.

The signaling message operation solution described in this embodiment of the present disclosure may be deployed in different places. A suggestion is to deploy the signaling message operation solution on any network node except the network node 1 and the network node 2 in a signaling message transmission path, for example, a switch or a router. Another suggestion is to deploy the signaling message operation solution on the network node 1 hosting the source virtual MME, but it needs to be ensured that the signaling message operation solution is deployed outside a core function of the source virtual MME such that the signaling message can be intercepted before being processed by the source virtual MME.

It should be noted that, the source VNF may not process the second signaling message for updating the second running status information if the second signaling message is further classified according to the foregoing method.

Step S103: Determine whether the following two conditions are true. condition a: whether all the copies of the first running status information in step S101 are received by the destination VNF; and condition b: whether both the first signaling message and the copy of the second signaling message are processed by the destination VNF.

Further, the condition b may be determined using the following method. If the destination VNF does not buffer the copy of the second signaling message and the preprocessing result of the copy of the second signaling message or that the copy of the second signaling message or the preprocessing result of the copy of the second signaling message buffered by the destination VNF is processed and that the first signaling message is processed, it is determined that both the first signaling message and the copy of the second signaling message are processed by the destination VNF. When a determining result in step S103 is yes, that is, both conditions are true, step S104 is performed.

Step S104: The source VNF is allowed to go offline such that the destination VNF runs the VNF instance.

When a determining result in step S103 is no, that is, either one of the two conditions is not true, the source VNF cannot go offline.

It should be noted that, in the foregoing process of performing the replication operation and the migration operation, the source VNF and the destination VNF may implement collaboration. For UEs associated with the second running status information created after the replication operation is started, the destination VNF implements their corresponding requests. The source VNF may still implement their corresponding requests for UEs associated with the first running status information that already exists before the replication operation is started. That is, in the foregoing method execution process, the source VNF is configured to process request messages of network devices associated with the first running status information that already exists before the method execution begins, and the destination VNF is configured to process request messages of network devices associated with the second running status information created after the method execution begins. As can be seen, in the method provided by this embodiment of the present disclosure, network communication established before the VNF instance is migrated and network communication established after the migration begins may not be interrupted.

Optionally, the destination VNF may send response messages or processing results to the source VNF such that the response messages or processing results are still sent to the user equipments or other network devices using the source VNF. In this way, the other devices are aware of only the source VNF but are not aware of the destination VNF, thereby ensuring transparency of migration of the VNF instance.

The destination VNF and source VNF provided by this embodiment of the present disclosure have same core functions, but also have a difference. The destination VNF buffers the second signaling message (or a processing result of the second signaling message) in order to update the running status information after the running status information is replicated when the second signaling message for updating running status information arrives at the destination VNF, and if corresponding running status information is not replicated yet. This function may not exist in the source VNF.

In a method for determining the condition a, in an implementation manner, this embodiment of the present disclosure may use a common means, for example, after the replication operation and the sending operation are performed on all running status information, it is assumed that all the running status information is successfully replicated to the destination VNF, without considering a case of replication or sending failure.

In another implementation manner, the method for determining the condition a includes receiving a first digest sent by the destination VNF after all the copies of the first running status information are sent to the destination VNF, where the first digest is generated by the destination VNF according to the running status information received by the destination VNF from the source VNF, and determining that all the copies of the first running status information are received by the destination VNF if the first digest is the same as a second digest, where the second digest is determined by the source VNF according to the first running status information or the copies of the first running status information.

Because a network fault or other faults may exist, and some running status information may be not really replicated to the destination VNF, the latter implementation method may more reliably ensure that the destination VNF successfully receives all the running status information that needs to be replicated, and further ensure migration efficiency of the VNF instance.

It should be noted that, the second digest may be generated before the replication operation is started, or a copy of all copies of current running status information may be reserved before the replication operation is started such that when the second digest is required, the copy performs real-time computation to acquire the second digest.

As can be seen from the description of the foregoing embodiment, this embodiment of the present disclosure provides a method for migrating a VNF instance. Before or when running status information replication is started, a signaling message migration operation is started such that signaling message migration can also be performed synchronously with running status information replication during migration of a VNF instance. When a large amount of fast changing running status information exists on a VNF, in comparison with the other approaches in which running status information before migration begins, new running status information created after migration begins, and changed running status information all need to be synchronized to a destination VNF, in this embodiment of the present disclosure, a low-cost signaling message migration mode is used such that the new running status information created after migration begins and the changed running status information can occur on the destination VNF with signaling message migration. Therefore, a high-cost synchronization operation on a large amount of running status information is avoided, migration efficiency of a VNF instance is improved, a backup VNF can take over a faulty VNF as quickly as possible, and fault recovery efficiency is improved.

Further, a faulty VNF (a source VNF) and a backup VNF (a destination VNF) can implement collaboration in a process of migrating a VNF instance. This avoids, to some extent, an interruption of network communication associated with the VNF instance.

Further, during the migration, the destination VNF may interact with user equipment using the source VNF, thereby ensuring transparency of the migration of the VNF instance.

The foregoing embodiment does not limit the method for replicating the first running status information. A person skilled in the art may determine a specific method for replicating the first running status information according to a specific migration environment.

Preferably, this embodiment of the present disclosure further provides a priority-based method for sending first running status information. The method sends the copies of the first running status information to the destination VNF in descending order of priorities, where the priorities of the copies of the first running status information are higher if change frequencies of the first running status information are higher.

It may be understood that, all the first running status information may be first replicated locally, and then the copies of the first running status information are sent to the destination VNF in descending order of priorities. Certainly, the copies may also be sent to the destination VNF at the same time when the first running status information is replicated in descending order of priorities, (or the first running status information may also be replicated to the destination VNF in descending order of priorities). Factors considered in the method are change frequencies of the first running status information, that is, first running status information that changes more frequently is sent to the destination VNF earlier. Because the first running status information that changes more frequently is more likely to become an update target of the second signaling message for updating the running status information, if the first running status information is sent to the destination VNF earlier, a quantity of second signaling messages buffered by the destination VNF can be reduced. Therefore, buffer costs are reduced, signaling message processing efficiency is improved, and further, the migration efficiency of the VNF instance is improved.

It should be noted that, because the copies of the first running status information are the same as the first running status information in this embodiment of the present disclosure, change frequencies of the copies of the first running status information are equivalent to the change frequencies of the first running status information.

In an implementation manner, the change frequencies of the first running status information are historical change frequencies of the first running status information, that is, past change frequencies of the first running status information that are determined according to change information of the first running status information in a past period of time. The "period of time" may be a period of time nearest to a current time, and a specific time length may be determined according to an actual VNF and/or determined according to an application scenario, which is not limited in this embodiment of the present disclosure.

In another implementation manner, the change frequencies of the first running status information are future change frequencies predicted according to historical change information of the first running status information. The method involves a predication method, that is, predicating possible change frequencies of the running status information in a future period of time according to change information of the first running status information in the past period of time. The predication method is implemented in many other approaches, for example, a decision tree algorithm, including a classification tree, a regression tree, and the like. For specific implementation of the decision tree algorithm and other predication methods, a person skilled in the art may refer to related documents about data mining or machine learning, and details are not provided in this embodiment of the present disclosure again.

A process of determining the priorities of the first running status information may be implemented in the OSS to fully use all types of information collected by the OSS from a VNF side, or may be implemented by the source VNF.

It is described in the previous embodiment of the present disclosure that the following case may occur in the method for migrating a VNF instance according to this embodiment of the present disclosure. The first running status information is not replicated to the destination VNF, but the second signaling message for updating the first running status information is already replicated to the destination VNF. If the priority-based method for replicating running status information is applied to the method for migrating a VNF according to this embodiment of the present disclosure, a case in which the first running status information is replicated later than the corresponding second signaling message may be avoided to some extent. Therefore, a quantity of signaling messages buffered by the destination VNF is reduced, and further, migration efficiency of the VNF is improved.

In addition, this embodiment of the present disclosure further provides another planning-based method for replicating first running status information, where the method may be used with the foregoing priority-based method, or may be used separately. Further, there are the following two replication methods.

A premise of the first replication method is that resources are limited, that is, resources provided for a replication operation are limited, where the resources include network resources and system resources, the system resources include a central processing unit (CPU), and the network resources include a network bandwidth. For example, CPU load for the replication operation is below 5%, and consumption of the network bandwidth is below 1 megabits per second (Mbps). In this case, steps of the replication method are as follows.

Step (a): According to a current status of the network resources, such as the bandwidth and a current status of the system resources, such as the CPU, determine multiple time periods for the replication operation, that is, the time periods in which resources can be provided for the replication operation.

Step (b): According to a size of to-be-replicated first running status information or according to a size of to-be-replicated first running status information and priorities of the first running status information, divide the first running status information into multiple information blocks, allocate the multiple information blocks to the determined multiple time periods, and perform replication of corresponding information blocks in corresponding time periods.

A premise of the second replication method, where replication needs to be completed within a specified time. In this case, steps of the replication method are as follows.

Step (a): According to a replication time (a replication operation needs be completed within the replication time) and a size of to-be-replication first running status information, determine required resources, that is, estimate usage of the system resources and the network resources.

Step (b): Divide all the to-be-replicated first running status information into one or more data blocks, and allocate the data block or data blocks to the determined resources in order to use the allocated resources to perform the replication operation. In this step, priorities of the to-be-replicated first running status information may also be considered, and resources are preferentially allocated to first running status information with a higher priority.

In the planning-based method for replicating first running status information, consumption of replication of the first running status information may be considered more comprehensively, which is advantageous to quick and successful replication of the running status information.

Figure 4:
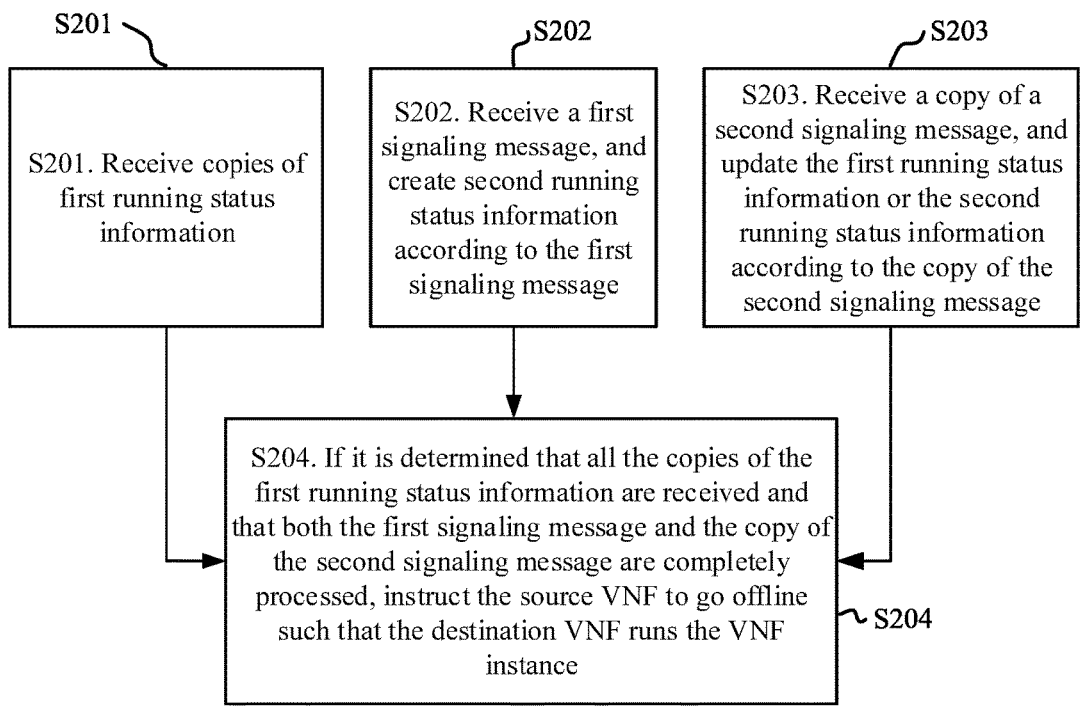
FIG. 4 is a schematic flowchart of a method for migrating a VNF instance according to an embodiment of the present disclosure.

Referring to FIG. 4, from a perspective of a destination VNF, an embodiment of the present disclosure further provides a method for receiving a VNF instance. The VNF instance is migrated from a source VNF to a destination VNF, the method is applied to the destination VNF, and the method includes the following steps.

Step S201: Receive copies of first running status information, where the first running status information is running status information that already exists in the source VNF before the migration begins.

Step S202: Receive a first signaling message, and create second running status information according to the first signaling message.

Step S203: Receive a copy of a second signaling message, and update the first running status information or the second running status information according to the copy of the second signaling message.

Further, updating the first running status information according to the copy of the second signaling message may include one or two of the following cases. updating the first running status information according to the second signaling message if first running status information that the copy of the second signaling message instructs to update exists, and buffering the copy of the second signaling message or a preprocessing result of the copy of the second signaling message in order to update the first running status information according to the copy of the second signaling message or the preprocessing result of the copy of the second signaling message after receiving the nonexistent first running status information from the source VNF if first running status information that the copy of the second signaling message instructs to update does not exist.

Optionally, buffering a preprocessing result of the copy of the second signaling message includes parsing the copy of the second signaling message to acquire information carried in the copy of the second signaling message, constructing the information carried in the copy of the second signaling message into a data structure same as a data structure of the running status information that the copy of the second signaling message instructs to update, and buffering the data structure.

Step S204: If determined that all the copies of the first running status information are received and that both the first signaling message and the copy of the second signaling message are processed, instruct the source VNF to go offline such that the destination VNF runs the VNF instance.

Optionally, buffering a preprocessing result of the signaling message includes parsing the signaling message to acquire information carried in the signaling message, constructing the information carried in the signaling message into a data structure same as a data structure of the running status information, and buffering the data structure. The information carried in the signaling message is constructed into the data structure same as the data structure of the running status information, and the data structure may be directly used to replace the running status information when the running status information is updated such that an update is implemented quickly.

A person skilled in the art may understand that the information carried in the signaling message may be further constructed into data structures of other types or other preprocessing methods are used, which is not limited in this embodiment of the present disclosure.

For step S204, further, in an implementation manner, if indication information sent by the source VNF or a third-party management entity is received, where the indication information indicates that all the copies of the first running status information are sent to the destination VNF or that all the first running status information is replicated to the destination VNF, the destination VNF determines that all the copies of the first running status information are received.

In another implementation manner, the destination VNF determines a first digest according to the received copies of the first running status information, and sends the first digest to the source VNF or a third-party management entity, and if indication information sent by the source VNF or the third-party management entity is received, where the indication information indicates that the first digest is the same as a second digest determined by the source VNF or the third-party management entity, the destination VNF determines that all the copies of the first running status information are received. The second digest is determined by the source VNF or the third-party management entity according to all the first running status information that already exists in the source VNF before the migration begins.

In the latter implementation manner, the destination VNF may send the first digest periodically, or may preset an occasion for sending the first digest, for example, send the first digest after receiving the indication information sent by the source VNF or the third-party management entity and indicates that all the first running status information that already exists in the source VNF before the migration begins is sent, or preset a time length t, and if the destination VNF receives no new running status information from the source VNF after a time greater than or equal to the time length t, send the first digest, where t may be in units of microseconds, seconds, or minutes, or the like, and may be determined according to a transmission rate of a communication channel between a source VNF and a destination VNF in an actual application scenario, and is not limited in this embodiment of the present disclosure.

In other implementation manners, when receiving no new running status information within a long time, the destination VNF may also determine that all the running status information that already exists in the source VNF before the migration begins is received. According to the method provided by this embodiment of the present disclosure, a person skilled in the art can easily figure out other implementation manners, which are not described herein one by one in the present disclosure.

Optionally, the step of instructing the source VNF to go offline may be implemented as follows. The destination VNF sends a go-offline instruction to the source VNF such that the source VNF performs the go-offline operation, or may be implemented as follows. The destination VNF sends go-offline instruction information to a third-party management function entity, such as an OSS such that the third-party management function entity controls the source VNF to go offline.

For all or some specific implementation of this embodiment of the present disclosure, reference may be made to the foregoing embodiment, and details are not provided herein again.

As can be seen, a VNF instance is received according to the method provided by this embodiment of the present disclosure such that signaling message migration can also be performed synchronously with running status information replication during migration of the VNF instance. Because running status information replication and signaling message migration occur simultaneously, new running status information created after migration and changed running status information can be synchronized to a backup VNF by means of signaling message migration, without undergoing their own replication or sending operations. Therefore, an amount of replicated or sent running status information is reduced, migration efficiency of a VNF instance is improved, the backup VNF can take over a faulty VNF as quickly as possible, and fault recovery efficiency is improved.

Figure 5:
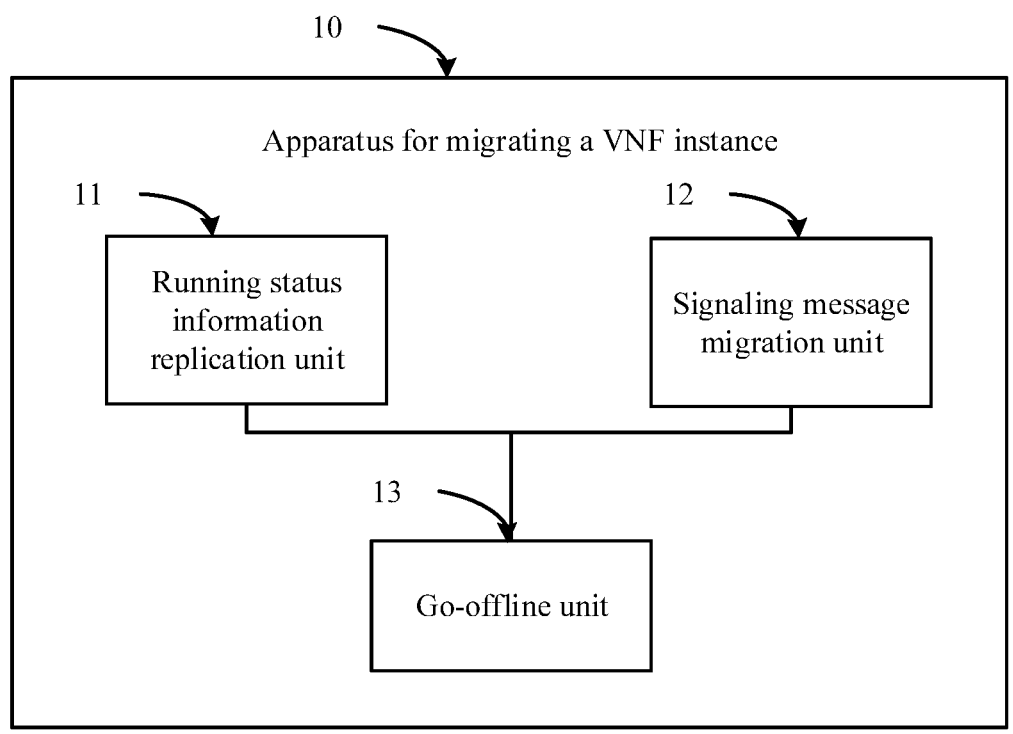
FIG. 5 is a schematic logical structural diagram of an apparatus for migrating a VNF instance according to an embodiment of the present disclosure.

Referring to FIG. 5, an embodiment of the present disclosure provides an apparatus for migrating a VNF instance 10, where the apparatus 10 is configured to implement migration of a VNF instance from a source VNF to a destination VNF. The apparatus 10 may be applied to the source VNF or a third-party management function entity, for example, an OSS. As shown in FIG. 5, the apparatus 10 includes a running status information replication unit 11, a signaling message migration unit 12, and a go-offline unit 13.

The running status information replication unit 11 is configured to start a running status information replication operation, where the replication operation includes sending copies of first running status information to a destination VNF, where the first running status information is running status information that already exists in a source VNF before the replication operation is started, and the running status information is running status information associated with the VNF instance.

It may be understood that, when the apparatus 10 is applied to a third-party management function entity, the running status information replication unit 11 is configured to control the source VNF to start the running status information replication operation. The source VNF is configured to start and perform the running status information replication operation under the control of the third-party management function entity.

The signaling message migration unit 12 is configured to start a signaling message migration operation when the replication operation is started or before the replication operation is started, where the migration operation includes sending the first signaling message to the destination VNF before a first signaling message is processed by the source VNF, where the first signaling message instructs the destination VNF to create second running status information on the destination VNF, and sending a copy of a second signaling message to the destination VNF, where the copy of the second signaling message instructs the destination VNF to update the first running status information or the second running status information.

It may be understood that, when the apparatus 10 is applied to the third-party management function entity, the signaling message migration unit 12 is configured to control the source VNF to start the signaling message migration operation when the replication operation is started or before the replication operation is started. The source VNF is configured to start and perform the signaling message migration operation under the control of the third-party management function entity.

The go-offline unit 13 is configured to allow to go offline if determined that all the copies of the first running status information are received by the destination VNF and that both the first signaling message and the copy of the second signaling message are processed by the destination VNF such that a destination VNF runs the VNF instance.

It may be understood that, when the apparatus 10 is applied to the third-party management function entity, the go-offline unit 13 is configured to control the source VNF to go offline if determined that all the copies of the first running status information are received by the destination VNF and that both the first signaling message and the copy of the second signaling message are processed by the destination VNF, for example, send ago-offline instruction to the source VNF. The go-offline unit 13 in the third-party management function entity may determine, according to information collected from the source VNF and/or the destination VNF, whether all the copies of the first running status information are received by the destination VNF or whether both the first signaling message and the copy of the second signaling message are processed by the destination VNF.

Optionally, the running status information replication unit 11 is further configured to send the copies of the first running status information to the destination VNF in descending order of priorities, that is, replicate the first running status information to the destination VNF in descending order of priorities), where the priorities of the copies of the first running status information are higher if change frequencies of the first running status information are higher. Further, the change frequencies may be historical change frequencies of the first running status information or future change frequencies predicted according to historical change information of the first running status information. For a specific method for acquiring the change frequencies, reference may be made to the foregoing method embodiment.

Optionally, in an implementation manner, in an aspect of determining that all the copies of the first running status information are received by the destination VNF, the go-offline unit 13 is further configured to receive a first digest sent by the destination VNF after all the copies of the first running status information are sent to the destination VNF, where the first digest is generated by the destination VNF according to the running status information received by the destination VNF from the source VNF, and determine that all the copies of the first running status information are received by the destination VNF if the first digest is the same as a second digest, where the second digest is determined by the source VNF according to the first running status information or the copies of the first running status information. This may ensure, to some extent, that all running status information that needs to be replicated is successfully replicated to the destination VNF.

In other implementation manners, the "determining" step may also be implemented with reference to other methods in the foregoing method embodiment or other methods that are not mentioned in the embodiments of the present disclosure.

Optionally, the running status information includes a user equipment context.

Optionally, starting a signaling message control operation before the replication operation is started includes starting the signaling message control operation K seconds before the replication operation is started, where K is greater than 0 and K is less than or equal to 5.

It should be noted that, in the foregoing process of performing the replication operation and the migration operation, the source VNF and the destination VNF may implement collaboration. For UEs associated with the running status information created after the replication operation is started, the destination VNF implements their corresponding requests. The source VNF may still implement their corresponding requests for UEs associated with the running status information that already exists before the replication operation is started. That is, in the foregoing method execution process, the source VNF is configured to process request messages of network devices associated with the running status information that already exists before the method execution begins, and the destination VNF is configured to process request messages of network devices associated with the running status information created after the method execution begins. As can be seen, in the method provided by this embodiment of the present disclosure, both network communication established before the VNF instance is migrated and network communication established after the migration begins may not be interrupted.

Optionally, the destination VNF may send response messages or processing results to the source VNF such that the response messages or processing results are still sent to the user equipments or other network devices using the source VNF. In this way, the other devices are aware of only the source VNF but are not aware of the destination VNF, thereby ensuring transparency of migration of the VNF instance.

For other specific implementation of this embodiment of the present disclosure, reference may be made to the foregoing method embodiment, and details are not provided herein again.

As can be seen from the description of the foregoing embodiment, this embodiment of the present disclosure provides an apparatus 10 for migrating a VNF instance. Before or when running status information replication is started, a signaling message migration operation is started such that signaling message migration can also be performed synchronously with running status information replication during migration of a VNF instance. Because running status information replication and signaling message migration occur simultaneously, new running status information created after migration and changed running status information do not need to be synchronized to a destination VNF. Therefore, an amount of replicated running status information is reduced, migration efficiency of a VNF instance is improved, a backup VNF can take over a faulty VNF as quickly as possible, and fault recovery efficiency is improved.

In addition, a faulty VNF (a source VNF) and a backup VNF (a destination VNF) can implement collaboration during migration of a VNF instance. This avoids, to some extent, an interruption of network communication associated with the VNF instance. Further, this embodiment of the present disclosure may also ensure transparency of migration of the VNF instance.

Figure 6:
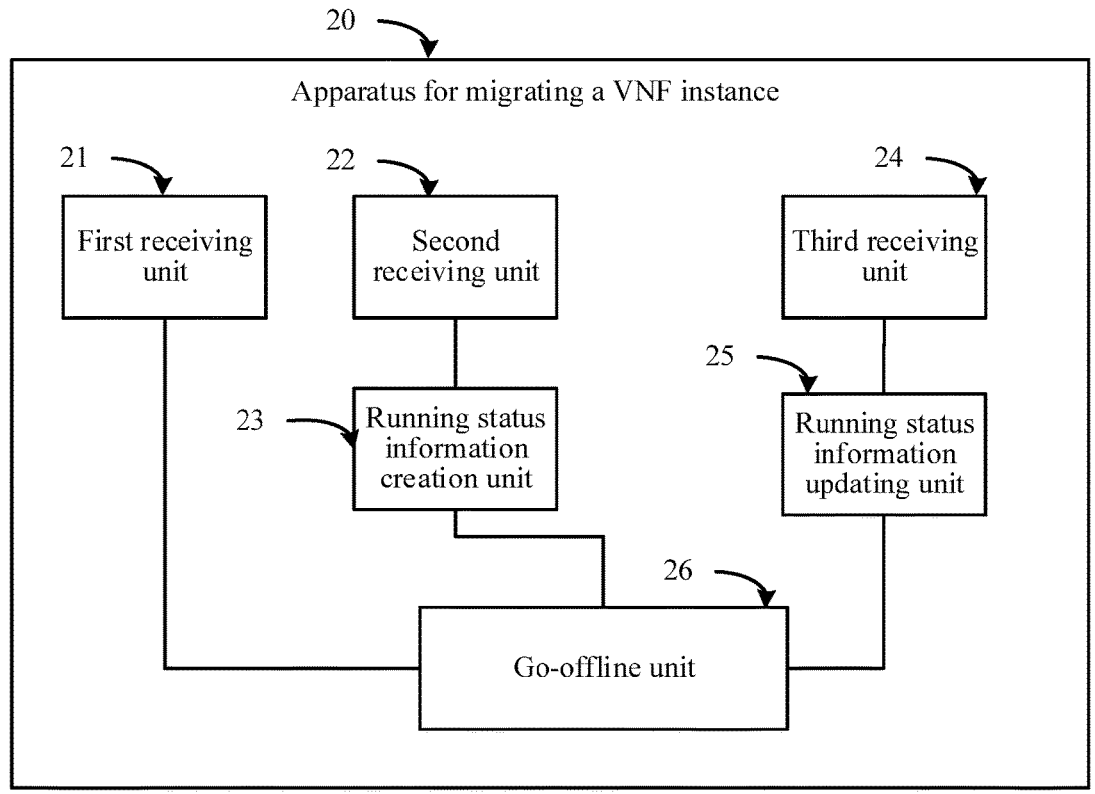
FIG. 6 is a schematic logical structural diagram of an apparatus for migrating a VNF instance according to an embodiment of the present disclosure.

Referring to FIG. 6, an embodiment of the present disclosure further provides another apparatus for migrating a VNF instance 20, where the apparatus 20 may be applied to a destination VNF, and is configured to implement migration of a VNF instance from a source VNF to the destination VNF. The apparatus 20 includes a first receiving unit 21 configured to receive copies of first running status information, where the first running status information is running status information that already exists in a source VNF before the migration begins, and the running status information is running status information associated with the VNF, and may be stored on a physical machine hosting the source VNF, a second receiving unit 22 configured to receive a first signaling message, where the first signaling message is a signaling message for creating running status information, a running status information creation unit 23 configured to create second running status information according to the first signaling message received by the second receiving unit 22, a third receiving unit 24 configured to receive a copy of a second signaling message, where the second signaling message is a signaling message for updating running status information, and the copy of the second signaling message is equivalent to the second signaling message, a running status information updating unit 25 configured to update the first running status information or the second running status information according to the copy of the second signaling message received by the third receiving unit 24, and a go-offline unit 26 configured to instruct the source VNF to go offline if all the copies of the first running status information are received and both the first signaling message and the copy of the second signaling message are processed such that a destination VNF runs the VNF instance.

Further, when updating the first running status information according to the copy of the second signaling message received by the third receiving unit 24, the running status information updating unit 25 may perform one or two of the following steps. updating the first running status information according to the second signaling message if first running status information that the copy of the second signaling message instructs to update exists, and buffering the copy of the second signaling message or a preprocessing result of the copy of the second signaling message in order to update the first running status information according to the copy of the second signaling message or the preprocessing result of the copy of the second signaling message after receiving the nonexistent first running status information from the source VNF if first running status information that the copy of the second signaling message instructs to update does not exist.

Optionally, in an aspect of buffering a preprocessing result of the copy of the second signaling message, the running status information updating unit 25 is further configured to parse the copy of the second signaling message to acquire information carried in the copy of the second signaling message, construct the information into a data structure same as a data structure of the first running status information, and buffer the data structure.

Optionally, in an implementation manner, in an aspect of determining that all the copies of the first running status information are received, the go-offline unit 26 is further configured to determine that all the copies of the first running status information are received if indication information sent by the source VNF is received, where the indication information indicates that all the copies of the first running status information are sent. In another implementation manner, in an aspect of determining that all the copies of the first running status information are received, the go-offline unit 26 is further configured to determine a first digest according to the received copies of the running status information, and send the first digest to the source VNF, and determine that all the copies of the first running status information are received if indication information sent by the source VNF is received, where the indication information indicates that the first digest is the same as a second digest determined by the source VNF, where the second digest is determined by the source VNF according to all the first running status information.

Optionally, in an implementation manner, in an aspect of instructing the source VNF to go offline, the go-offline unit 26 is further configured to send a go-offline instruction to the source VNF such that the source VNF performs the go-offline operation. In another implementation manner, the go-offline unit 26 sends the go-offline instruction to a third-party management function entity, such as an OSS such that the third-party management function entity controls the source VNF to go offline.

Figure 7A:
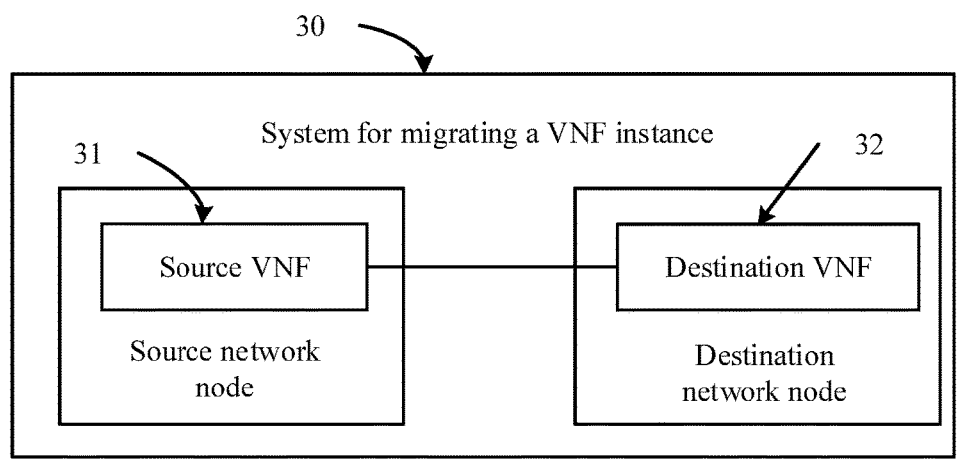
FIG. 7A is a schematic architectural diagram of a system for migrating a VNF instance according to an embodiment of the present disclosure.

Referring to FIG. 7A, FIG. 7A shows a system for migrating a VNF instance 30 according to an embodiment of the present disclosure.

The system 30 includes a source network node and a destination network node. A source VNF 31 runs on the source network node, a destination VNF 32 runs on the destination network node, and before the VNF instance is migrated, the VNF instance runs on the source VNF 31. As described in the foregoing embodiment, the method for migrating a VNF according to the embodiments of the present disclosure may be implemented by only the source VNF 31 and the destination VNF 32.

The source VNF 31 is configured to start and perform a running status information replication operation, where the replication operation includes sending copies of first running status information to the destination VNF 32 on the destination network node, where the first running status information is running status information that already exists in the source VNF 31 before the replication operation is started. The running status information is running status information stored in the source VNF 31 and associated with the VNF 31.

The destination VNF 32 is configured to receive and store the copies of the first running status information from the source VNF 31.

The source VNF 31 is further configured to start and perform a signaling message migration operation when the replication operation is started or before the replication operation is started, where before a first signaling message is processed by the source VNF 31, the migration operation includes sending the first signaling message to the destination VNF, and sending a copy of a second signaling message to the destination VNF 32.

The destination VNF 32 is further configured to receive the first signaling message, create second running status information according to the first signaling message, receive the copy of the second signaling message, and update the first running status information or the second running status information according to the copy of the second signaling message.

The source VNF 31 is further configured to allow the source VNF 31 to go offline if all the copies of the first running status information are received by the destination VNF 32 and that both the first signaling message and the copy of the second signaling message are processed by the destination VNF 32 such that the destination VNF 32 runs the VNF instance.

Optionally, in other implementation manners, the go-offline operation of the source VNF 31 may also be implemented by the destination VNF 32 actively. In this manner, the destination VNF 32 is further configured to instruct the source VNF 31 to go offline if all the copies of the first running status information are received by the destination VNF 32 and both the first signaling message and the copy of the second signaling message are processed by the destination VNF 32 such that the destination VNF 32 runs the VNF instance.

It should be noted that, the source VNF 31 and the destination VNF 32 shown in FIG. 7A are located on different network nodes. In other implementation manners, the source VNF 31 and the destination VNF 32 may also be located on a same network node, for example, on different virtual machines of a same network node or on a same virtual machine.

Figure 7B:
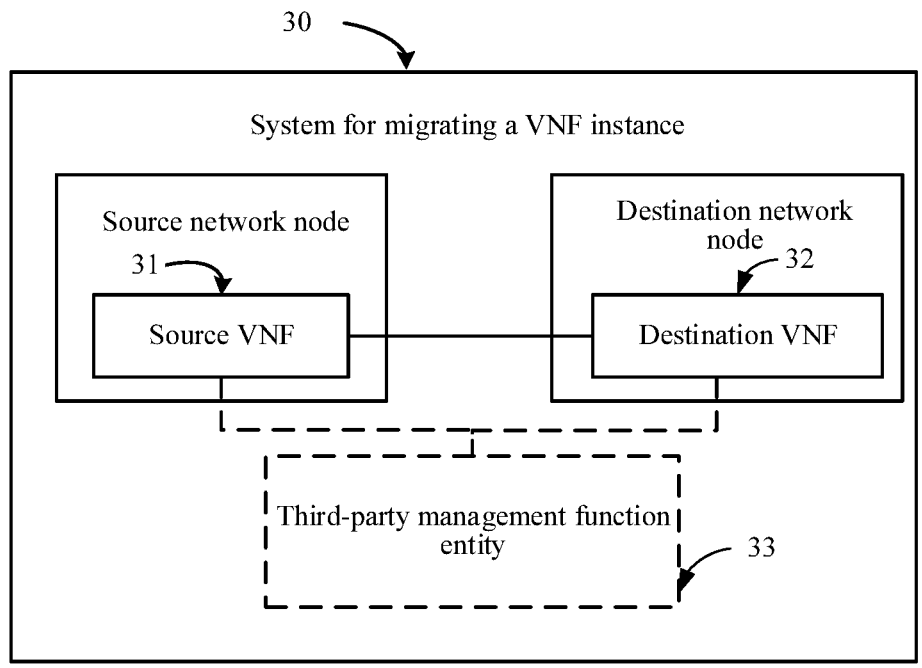
FIG. 7B is a schematic architectural diagram of another system for migrating a VNF instance according to an embodiment of the present disclosure.

Referring to FIG. 7B, FIG. 7B is a system for migrating a VNF instance 30 according to an embodiment of the present disclosure.

The system 30 includes a source network node, a destination network node, and a third-party management function entity 33. A source VNF 31 runs on the source network node, a destination VNF 32 runs on the destination network node, and before the VNF instance is migrated, the VNF instance runs on the source VNF 31.

The system for migrating a VNF instance 30 according to this embodiment of the present disclosure involves the third-party management function entity 31, for example, an OSS, and the third-party management function entity 33 controls the source VNF 31 and the destination VNF 32 to implement migration of the VNF instance.

In the system 30 shown in FIG. 7B, the third-party management function entity 33 may be configured to control the source VNF 31 to start a running status information replication operation, and control the source VNF 31 to start a signaling message migration operation when the replication operation is started or before the replication operation is started. Further, the third-party management function entity 33 may perform the foregoing operation if a preset condition is met. Moreover, when the source VNF 31 is faulty (a fault message sent by the source VNF 31 or a physical host hosting the source VNF 31 is received), the third-party management function entity 33 may send a message to the source VNF 31, instructing to start the operation of migrating the VNF instance in order to control the source VNF 31 to start the running status information replication operation.

The third-party management function entity 33 is further configured to control the source VNF 31 to start the signaling message migration operation when the replication operation is started or before the replication operation is started.

The source VNF 31 is configured to start and perform the running status information replication operation under the control of the third-party management function entity 33, where the replication operation includes sending copies of first running status information to the destination VNF 32, where the first running status information is running status information that already exists in the source VNF 31 before the replication operation is started.

The destination VNF 32 is configured to receive and store the copies of the first running status information from the source VNF 31.

The source VNF 31 is further configured to start and perform the signaling message migration operation under the control of the third-party management function entity 33, where before a first signaling message is processed by the source VNF 31, the migration operation includes sending the first signaling message to the destination VNF 32, and sending a copy of a second signaling message to the destination VNF 32.

The destination VNF 32 is further configured to receive the first signaling message, create second running status information according to the first signaling message, receive the copy of the second signaling message, and update the first running status information or the second running status information according to the copy of the second signaling message.

The destination VNF 32 is further configured to send a go-offline instruction to the third-party management function entity 33 if all the copies of the first running status information are received and both the first signaling message and the copy of the second signaling message are processed.

The third-party management function entity 33 is further configured to control, according to the instruction message, the source VNF 31 to go offline such that the destination VNF 32 runs the VNF instance.

The source VNF 31, the destination VNF 32, and the third-party management function entity shown in FIG. 7B are located on different network nodes. In other implementation manners, the source VNF 31, the destination VNF 32, and the third-party management function may be located on a same network node, or the VNF 31 and the destination VNF 32 are located on a same network node.

It should be noted that, for the method for migrating an instance from the source VNF to the destination VNF involved in the foregoing migration system and more specific implementation, reference may be made to the foregoing method and/or apparatus embodiment.

The following describes specific structures of a third-party management function entity and a source network node or a destination network node using embodiments.

Figure 8:
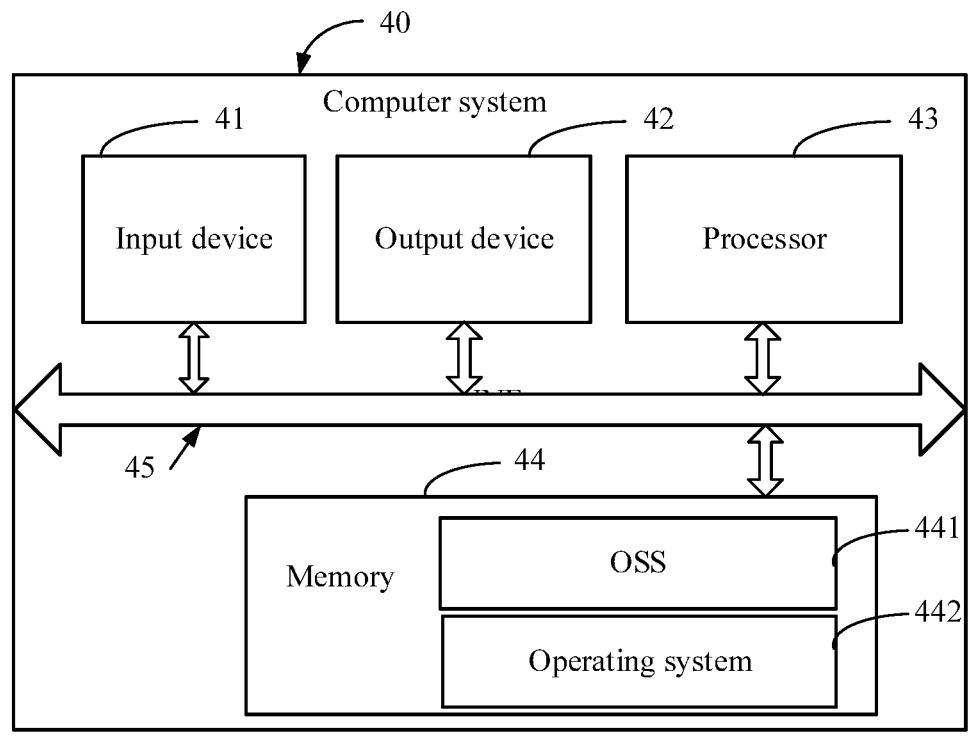
FIG. 8 is a schematic logical structural diagram of a computer system according to an embodiment of the present disclosure.

Referring to FIG. 8, FIG. 8 is a computer system 40 provided by an embodiment of the present disclosure. An OSS, or a system integrating an OSS and a BSS, or a third-party management function entity of another type is disposed in the computer system 40. Using an OSS 441 as an example in this embodiment of the present disclosure, the OSS 441 is stored as a software program in a memory 44 of the computer system 40, and the OSS 441 is invoked by a processor 43. The OSS 441 may collaborate with a source VNF and a destination VNF to implement the method for migrating a VNF instance according to the embodiments of the present disclosure (the OSS 441 may further implement a function of the OSS in the other approaches). Further, the processor 43 performs the following operations after reading the OSS 441 in the memory 44. Controlling the source VNF to start a running status information replication operation, controlling the source VNF to start a signaling message migration operation when the replication operation is started or before the replication operation is started, and controlling the source VNF to go offline after the migration is completed such that the destination VNF runs the VNF instance.

It should be noted that, for a specific method in which the OSS 441 collaborates with the source VNF and the destination VNF to implement the migration, reference may be made to the foregoing embodiment, and details are not provided herein again.

Optionally, as shown in FIG. 8, the computer system 40 may further include an input device 41, for example, a touchscreen, a keyboard, or a mouse, and an output device 42, for example, a display screen that has only a display function or a touchscreen that has both display and input functions. The input device 41, the output device 42, the processor 43, and the memory 44 may be connected to a bus 45. The bus 45 in this embodiment of the present disclosure may be an industry standard architecture (ISA) bus, a peripheral component interconnect (PCI) bus, an extended ISA (EISA) bus, or the like. The bus 45 may be one or more physical lines, and when the bus 45 is multiple physical lines, the bus 45 may be classified into an address bus, a data bus, a control bus, and the like. The memory 44 generally stores an operating system 442, where the operating system 442 may be an operating system of any type, such as WINDOWS LINUX or UNIX.

The computer system 40 described in the foregoing embodiment is configured to implement the OSS or a third-party management function entity of another type such that the OSS or the third-party management function entity of another type, the source VNF, and the destination VNF jointly implement the method for migrating a VNF instance according to the embodiments of the present disclosure.

Figure 9:
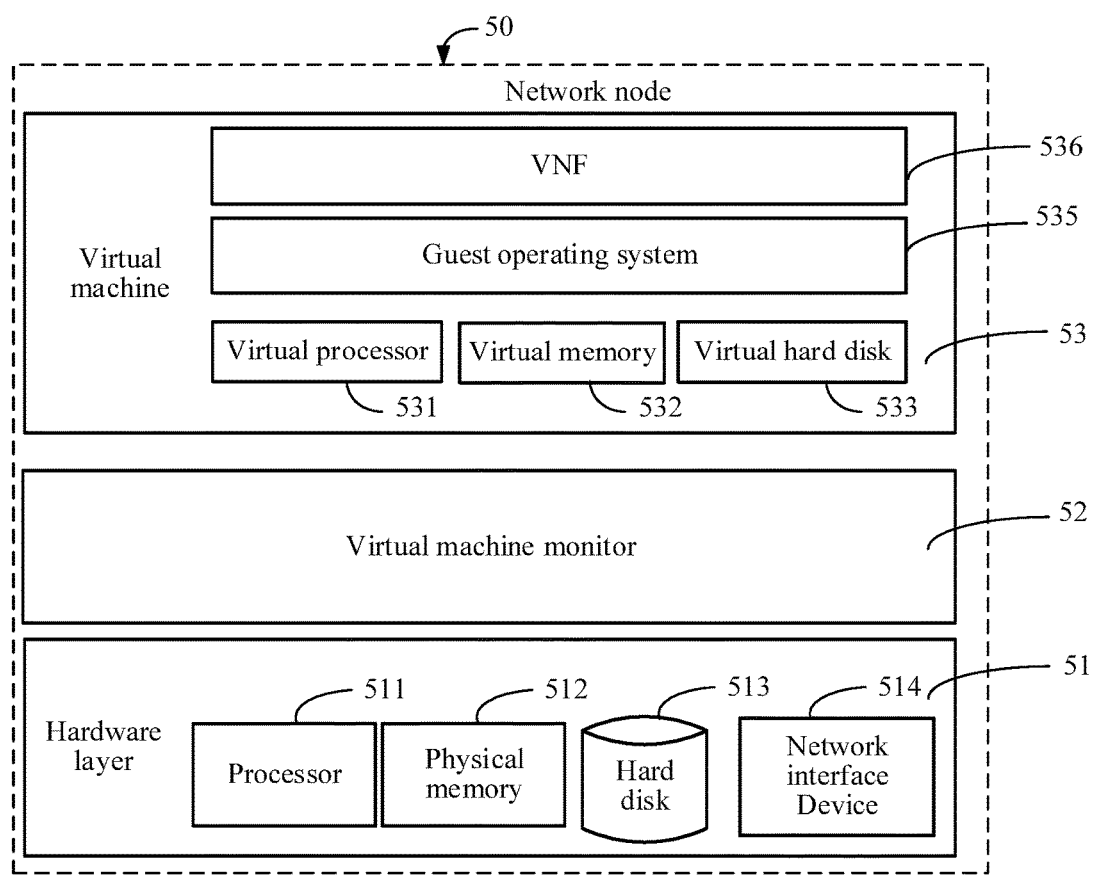
FIG. 9 is a schematic logical structural diagram of a network node according to an embodiment of the present disclosure.

FIG. 9 is a network node 50 provided by an embodiment of the present disclosure. The network node 50 may be an MME node, an SGW node or a PGW node. Correspondingly, a VNF 536 on the network node is configured to implement a function of the MME, a function of the SGW, or a function of the PGW.

Referring to FIG. 9, the network node 50 includes a hardware layer 51, a virtual machine monitor 52 running on the hardware layer 51, and one or more virtual machines 53 running on the virtual machine monitor 52. The hardware layer 51 may include a processor 511, a physical memory 512, a hard disk 513, and a network interface device 514. There may be one or more processors 511. The network interface device 514 may be a network adapter or a network card, and is configured to establish a connection to any network that may be connected, for example, the Internet or an enterprise network. The virtual machine 53 may include a virtual processor 531, a virtual memory 532, a virtual hard disk 533, and a guest operating system 535, where the guest operating system 535 is an operating system running on a virtual device such as the virtual processor 531, the virtual memory 532, or the virtual hard disk 533. The VNF 536 further runs on the guest operating system 535. The VNF 536 may be used as a first VNF, and is configured to implement the method of the source VNF described in the foregoing embodiment.

Further, the first VNF 536 is configured to start a running status information replication operation, where the replication operation includes sending copies of first running status information to a second VNF, where the first running status information is running status information associated with a VNF instance running on the first VNF and already exists in the first VNF before the replication operation is started. The first VNF 536 is further configured to start a signaling message migration operation when the replication operation is started or before the replication operation is started, where before a first signaling message is processed by the first VNF 536, the migration operation includes sending the first signaling message to the second VNF, where the first signaling message instructs the second VNF to create second running status information on the second VNF, and sending a copy of a second signaling message to the second VNF, where the copy of the second signaling message instructs the second VNF to update the first running status information or the second running status information, and the first VNF 536 is further configured to allow the first VNF to go offline if all the copies of the first running status information are received by the second VNF and that both the first signaling message and the copy of the second signaling message are processed by the second VNF such that the second VNF runs the VNF instance.

Optionally, in an aspect of performing the replication operation, the source VNF is configured to send the copies of the first running status information to the destination VNF in descending order of priorities, where the priorities of the copies of the first running status information are higher if change frequencies of the first running status information are higher.

For more detailed implementation manners, reference may be made to the foregoing embodiment, and details are not provided herein again.

In other implementation manners, the VNF 536 may also be used as a second VNF to implement the method of the destination VNF described in the foregoing embodiment.

Further, the destination VNF 536 is configured to receive copies of first running status information, where the first running status information is running status information that already exists in a first VNF before an operation of migrating a VNF instance begins, where the VNF instance runs on the first VNF before the migration operation begins, receive a first signaling message, create second running status information according to the first signaling message, receive a copy of a second signaling message, update the first running status information or the second running status information according to the copy of the second signaling message, and instruct the first VNF to go offline if all the copies of the first running status information are received and that both the first signaling message and the copy of the second signaling message are processed such that the second VNF runs the VNF instance.

For more detailed implementation manners, reference may be made to the foregoing embodiment, and details are not provided herein again.

It should be noted that, both the first VNF (source VNF) and the second VNF (destination VNF) described above may be located on the network node 50. For example, the two VNFs are respectively located in two virtual machines of the network node 50, or located in a same virtual machine of the network node 50.

Most parts of the structure shown in FIG. 9 are a universal structure of a virtualization technology. The OSS system or the third-party management function entity of another type described in other embodiments of the present disclosure may use the virtualization technology for implementation based on the universal structure.

It may be understood that, the network node 50 shown in FIG. 9 may be one physical host, or may be multiple physical hosts. When the network node 50 is multiple physical hosts, virtual resources of the multiple physical hosts, for example, a virtual processor 531, a virtual memory 532, or a virtual hard disk 533, may be shared by multiple virtual machines 53 running on an upper layer.

To sum up, the embodiments of the present disclosure provide a method, an apparatus, and a system for migrating a VNF instance. Before or when running status information replication is started, a signaling message migration operation is started such that signaling message migration can also be performed synchronously with running status information replication during migration of a VNF instance. When a large amount of fast changing running status information exists on a VNF, in comparison with the other approaches in which running status information before migration begins, new running status information created after migration begins, and changed running status information all need to be synchronized to a destination VNF, in the embodiments of the present disclosure, a low-cost signaling message migration mode is used such that the new running status information created after migration begins and the changed running status information can occur on the destination VNF with signaling message migration. Therefore, a high-cost synchronization operation on a large amount of running status information is avoided, migration efficiency of a VNF instance is improved, a backup VNF can take over a faulty VNF as quickly as possible, and fault recovery efficiency is improved.

Further, a faulty VNF (a source VNF) and a backup VNF (a destination VNF) can implement collaboration in a process of migrating a VNF instance. This avoids, to some extent, an interruption of network communication associated with the VNF instance.

Further, during the migration, the destination VNF may interact with user equipment using the source VNF, thereby ensuring transparency of the migration of the VNF instance.

It should be noted that, the "copy" mentioned in the embodiments of the present disclosure is not necessarily information that is the same as original information and generated after the original information is replicated, and may also refer to original information. For example, copies of running status information may refer to the original running status information itself, or may refer to running status information that is the same as the original running status information and generated after the original running status information is replicated. Sending a copy may be sending after replication, or may be sending when reading original information and reserving the original information locally.

It should be noted that, implementation of the method provided by the present disclosure may involve "an implementation manner" and "another implementation manner" and the like, which does not mean that the present disclosure can be implemented in only the illustrated implementation manners. The illustrated implementation manners are used as only specific examples of the present disclosure. Other implementation manners that may be easily figured out by a person skilled in the art according to the method disclosed by the present disclosure shall fall within the protection scope of the present disclosure.

It should be noted that, any apparatus embodiment described above is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be further implemented as one or more communications buses or signal cables. A person of ordinary skill in the art may understand and implement the embodiments of the present disclosure without creative efforts.

Based on the description of the foregoing implementation manners, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the other approaches may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present disclosure.

It may be clearly understood by a person skilled in the art that, for a detailed working process of the foregoing system, apparatus, and unit, reference may be made to a corresponding process in the foregoing method embodiments, and details are not provided herein again.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for migrating a virtual network function instance, comprising:
   starting a running status information replication operation, wherein the replication operation comprises sending copies of first running status information to a destination virtual network function, wherein the first running status information is running status information that already exists in a source virtual network function before the replication operation is started, wherein sending the copies of the first running status information to the destination virtual network function comprises sending the copies of the first running status information to the destination virtual network function in descending order of priorities, and wherein the priorities of the copies of the first running status information are higher when change frequencies of the first running status information are higher;
   starting a signaling message migration operation when starting the replication operation, wherein the migration operation comprises:
      sending a first signaling message to the destination virtual network function before the first signaling message is processed by the source virtual network function, wherein the first signaling message instructs the destination virtual network function to create second running status information on the destination virtual network function; and
      sending a copy of a second signaling message to the destination virtual network function, wherein the copy of the second signaling message instructs the destination virtual network function to update the first running status information; and
   instructing the source virtual network function to go offline such that the destination virtual network function runs the virtual network function instance when determined that all the copies of the first running status information are received by the destination virtual network function and both the first signaling message and the copy of the second signaling message are processed by the destination virtual network function.

2. The method of claim 1, wherein the change frequencies are historical change frequencies of the first running status information.

3. The method of claim 1, wherein the change frequencies are future change frequencies predicted according to historical changes of the first running status information.

4. The method of claim 1, wherein determining all the copies of the first running status information are received by the destination virtual network function comprises:
receiving a first digest from the destination virtual network function after all the copies of the first running status information are sent to the destination virtual network function, wherein the first digest is generated by the destination virtual network function according to the running status information received by the destination virtual network function from the source virtual network function; and
determining all the copies of the first running status information are received by the destination virtual network function when the first digest is the same as a second digest, wherein the second digest is determined by the source virtual network function according to the first running status information.

5. The method of claim 1, wherein determining all the copies of the first running status information are received by the destination virtual network function comprises:
receiving a first digest from the destination virtual network function after all the copies of the first running status information are sent to the destination virtual network function, wherein the first digest is generated by the destination virtual network function according to the running status information received by the destination virtual network function from the source virtual network function; and
determining all the copies of the first running status information are received by the destination virtual network function when the first digest is the same as a second digest, wherein the second digest is determined by the source virtual network function according to the copies of the first running status information.

6. The method of claim 1, wherein the running status information comprises a user equipment context.

7. The method of claim 1, further comprising instructing the virtual network function to not go offline when all the copies of the first running status information are not received by the destination virtual network function.

8. The method of claim 1, further comprising instructing the virtual network function to not go offline when both the first signaling message and the copy of the second signaling message are processed by the destination virtual network function.

9. The method of claim 1, wherein the source virtual network is instructed to go offline when both all the copies of the first running status information are received by the destination virtual network function and when both the first signaling message and the copy of the second signaling message are processed by the destination virtual network function.

10. A method for migrating a virtual network function instance, wherein the virtual network function instance is migrated from a source virtual network function to a destination virtual network function, wherein the method is applied to the destination virtual network function, and wherein the method comprises:
receiving copies of first running status information, wherein the first running status information is running status information that already exists in the source virtual network function before the migration begins;
receiving a first signaling message;
creating second running status information according to the first signaling message;
receiving a copy of a second signaling message;
updating the first running status information according to the copy of the second signaling message;
instructing the source virtual network function to go offline such that the destination virtual network function runs the virtual network function instance when all the copies of the first running status information are received and both the first signaling message and the copy of the second signaling message are processed; and
determining all the copies of the first running status information are received by:
determining a first digest according to the received copies of the first running status information;
sending the first digest to the source virtual network function;
determining all the copies of the first running status information are received when indication information from the source virtual network function is received, wherein the indication information indicates that the first digest is the same as a second digest determined by the source virtual network function, and wherein the second digest is determined by the source virtual network function according to all the first running status information.

11. The method of claim 10, wherein updating the first running status information comprises:
updating the first running status information according to the second signaling message when the first running status information that the copy of the second signaling message instructs to update exists; and
buffering the copy of the second signaling message in order to update the first running status information according to the copy of the second signaling message after receiving nonexistent first running status information from the source virtual network function when first running status information that the copy of the second signaling message instructs to update does not exist.

12. The method of claim 10, wherein updating the first running status information comprises:
updating the first running status information according to the second signaling message when the first running status information that the copy of the second signaling message instructs to update exists; and
buffering a preprocessing result of the copy of the second signaling message in order to update the first running status information according to the preprocessing result of the copy of the second signaling message after receiving nonexistent first running status information from the source virtual network function when first running status information that the copy of the second signaling message instructs to update does not exist.

13. The method of claim 12, wherein buffering the preprocessing result of the copy of the second signaling message comprises:
parsing the copy of the second signaling message to acquire information carried in the copy of the second signaling message;
constructing the information comprised in the copy of the second signaling message into a data structure the same as a data structure of the running status information that the copy of the second signaling message instructs to update; and
buffering the data structure.

14. The method of claim 10, wherein instructing the source virtual network function to go offline comprises sending a go-offline instruction to the source virtual network function such that the source virtual network function performs the go-offline operation.

15. An apparatus for migrating a virtual network function instance, comprising:
- a non-transitory computer-readable storage medium comprising programming instructions; and
- a processor coupled to the non-transitory computer-readable storage medium, wherein the programming instructions cause the processor to be configured to:
  - start a running status information replication operation, wherein the replication operation comprises sending copies of first running status information to a destination virtual network function, and wherein the first running status information is running status information that already exists in a source virtual network function before the replication operation is started;
  - start a signaling message migration operation when the replication operation is started, wherein the migration operation comprises:
    - sending a first signaling message to the destination virtual network function before the first signaling message is processed by the source virtual network function, wherein the first signaling message instructs the destination virtual network function to create second running status information on the destination virtual network function; and
    - sending a copy of a second signaling message to the destination virtual network function, wherein the copy of the second signaling message instructs the destination virtual network function to update the first running status information;
  - instruct to go offline when all the copies of the first running status information are received by the destination virtual network function and both the first signaling message and the copy of the second signaling message are processed by the destination virtual network function such that the destination virtual network function runs the virtual network function instance; and
  - send the copies of the first running status information to the destination virtual network function in descending order of priorities, wherein the priorities of the copies of the first running status information are higher when change frequencies of the first running status information are higher.

16. The apparatus of claim 15, wherein the processor is further configured to instruct the virtual network function to not go offline when all the copies of the first running status information are not received by the destination virtual network function.

17. The apparatus of claim 15, wherein the processor is further configured to instruct the virtual network function to not go offline when both the first signaling message and the copy of the second signaling message are processed by the destination virtual network function.

18. The apparatus of claim 15, wherein the source virtual network is instructed to go offline when both all the copies of the first running status information are received by the destination virtual network function and when both the first signaling message and the copy of the second signaling message are processed by the destination virtual network function.

* * * * *